United States Patent
Yin et al.

(10) Patent No.: US 12,480,445 B2
(45) Date of Patent: Nov. 25, 2025

(54) ELECTRIC COMPONENT FOR ELECTRIC POWER TRANSMISSION IN AN ELECTRIC SYSTEM

(71) Applicant: General Electric Company, Schenectady, NY (US)

(72) Inventors: Weijun Yin, Niskayuna, NY (US); Karim Younsi, Ballston Lake, NY (US); Ibrahima Ndiaye, Ballston Spa, NY (US)

(73) Assignee: General Electric Company, Evendale, OH (US)

( * ) Notice: Subject to any disclaimer, the term of this patent is extended or adjusted under 35 U.S.C. 154(b) by 504 days.

(21) Appl. No.: 17/883,809

(22) Filed: Aug. 9, 2022

(65) Prior Publication Data
US 2023/0046156 A1 Feb. 16, 2023

Related U.S. Application Data

(60) Provisional application No. 63/231,865, filed on Aug. 11, 2021.

(51) Int. Cl.
*H01M 50/59* (2021.01)
*B64D 27/33* (2024.01)
(Continued)

(52) U.S. Cl.
CPC .............. *F02C 6/206* (2013.01); *B64D 27/33* (2024.01); *B64D 27/355* (2024.01); *B64D 27/357* (2024.01); *B64D 35/021* (2024.01); *H01B 3/16* (2013.01); *H01B 7/0233* (2013.01); *H01B 7/423* (2013.01); *H01B 9/00* (2013.01); *H01M 8/02* (2013.01); *H01M 50/249* (2021.01);
(Continued)

(58) Field of Classification Search
None
See application file for complete search history.

(56) References Cited

U.S. PATENT DOCUMENTS 2,454,800 A * 11/1948 Stolte .................. H01B 7/0233
524/925
3,852,511 A 12/1974 Artbauer
(Continued)

FOREIGN PATENT DOCUMENTS

DE 1765682 A1 8/1971
DE 2402851 A1 7/1975
(Continued)

OTHER PUBLICATIONS

Cheetham et al., "Feasibility of Superconducting Gas-Insulated Transmission Lines for Electric Aviation Applications", 2018 IEEE International Conference On Electrical Systems For Aircraft, Railway, Ship Propulsion And Road Vehicles & International Transportation Electrification Conference (ESARS-ITEC), Nov. 1, 2018, pp. 1-6.
(Continued)

*Primary Examiner* — Gerald L Sung
*Assistant Examiner* — Jacek Lisowski
(74) *Attorney, Agent, or Firm* — Dority & Manning, P.A.

(57) ABSTRACT

An electric component for an electric system that includes a working component, a housing that encloses the working component, and an electrical insulator that is disposed between the housing and the working component.

19 Claims, 10 Drawing Sheets

(51) Int. Cl.
*B64D 27/355* (2024.01)
*B64D 27/357* (2024.01)
*B64D 35/021* (2024.01)
*F02C 6/20* (2006.01)
*H01B 3/16* (2006.01)
*H01B 7/02* (2006.01)
*H01B 7/42* (2006.01)
*H01B 9/00* (2006.01)
*H01M 8/02* (2016.01)
*H01M 50/249* (2021.01)
*H01M 50/298* (2021.01)
*H01M 50/588* (2021.01)
*H02K 5/08* (2006.01)
*H02K 5/22* (2006.01)
*H02K 11/00* (2016.01)
*B64D 27/10* (2006.01)

(52) U.S. Cl.
CPC ....... *H01M 50/298* (2021.01); *H01M 50/588* (2021.01); *H01M 50/59* (2021.01); *H02K 5/08* (2013.01); *H02K 5/225* (2013.01); *H02K 11/0094* (2013.01); *B64D 27/10* (2013.01); *H01M 2220/20* (2013.01); *H01M 2250/20* (2013.01)

(56) References Cited

U.S. PATENT DOCUMENTS

| | | | |
|---|---|---|---|
| 4,175,212 A | 11/1979 | Artbauer | |
| 4,783,576 A | 11/1988 | Silver et al. | |
| 7,495,442 B2 | 2/2009 | Heid | |
| 9,193,311 B2 | 11/2015 | Siegel et al. | |
| 9,889,807 B2 | 2/2018 | Siegel et al. | |
| 2002/0189233 A1* | 12/2002 | Harvey | F02K 9/974 60/255 |
| 2009/0096317 A1* | 4/2009 | Sasaki | H02K 5/04 310/400 |
| 2013/0008603 A1 | 1/2013 | Eto et al. | |
| 2013/0033796 A1* | 2/2013 | Shea | H01H 39/004 361/126 |
| 2016/0268784 A1 | 9/2016 | Toshimura et al. | |
| 2017/0074446 A1* | 3/2017 | Sumner | F16L 59/143 |
| 2017/0125782 A1* | 5/2017 | Liu | H01M 50/202 |
| 2018/0304753 A1* | 10/2018 | Vondrell | B64D 27/12 |
| 2018/0305036 A1* | 10/2018 | Vondrell | B60L 50/16 |
| 2018/0334258 A1* | 11/2018 | Vondrell | B64D 27/18 |
| 2019/0148037 A1 | 5/2019 | Leach et al. | |
| 2019/0372318 A1 | 12/2019 | Kawano et al. | |
| 2019/0375925 A1* | 12/2019 | Mohri | H02G 15/18 |
| 2020/0070990 A1* | 3/2020 | Harvey | B64D 27/24 |
| 2021/0119193 A1* | 4/2021 | Eftekhari | H01M 50/227 |

FOREIGN PATENT DOCUMENTS

| | | |
|---|---|---|
| DE | 2925638 A1 | 12/1980 |
| DE | 102014215498 A1 | 2/2016 |
| EP | 2062268 A1 | 5/2009 |
| EP | 2390978 A1 | 11/2011 |
| FR | 3008241 A1 | 1/2015 |

OTHER PUBLICATIONS

Aviation Daily, Aviation Week Intelligence Network, Mar. 17, 2021, 10 Pages.

Chen et al., Thermal Modeling of Hollow Conductors for Direct Cooling of Electrical Machines, IEEE Transactions on Industrial Electronics, vol. 67, Issue 2, Feb. 2020, pp. 895-905. https://ieeexplore.ieee.org/document/8648388.

* cited by examiner

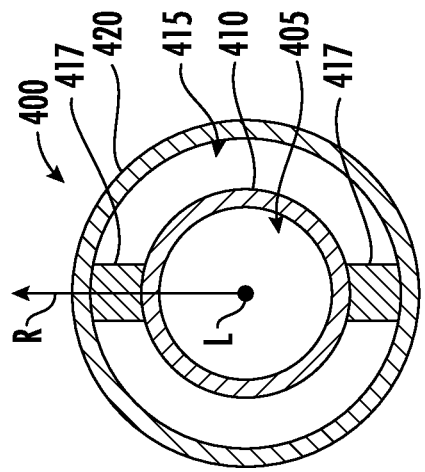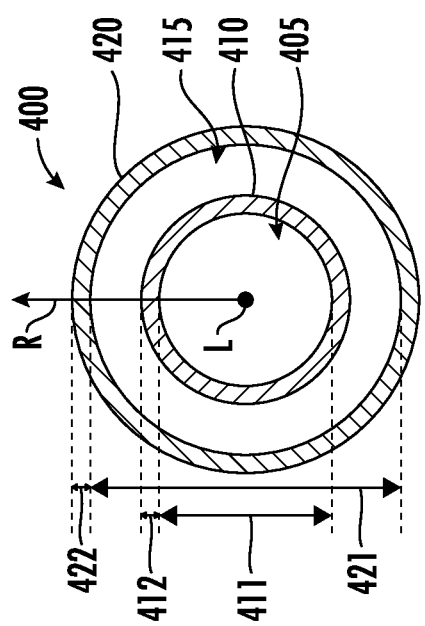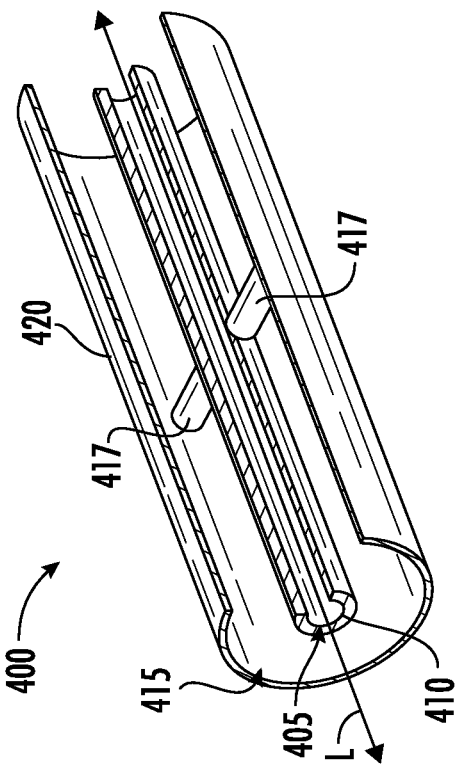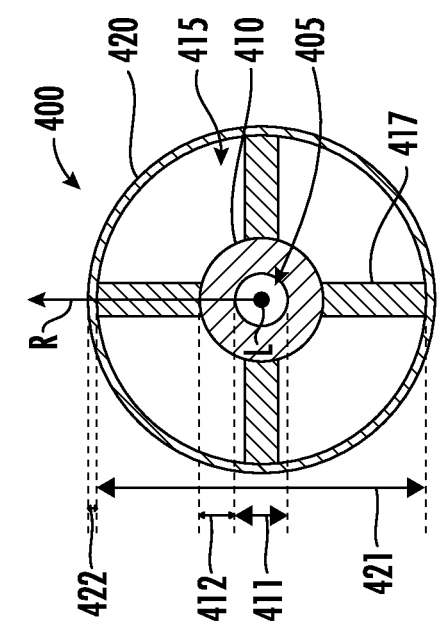

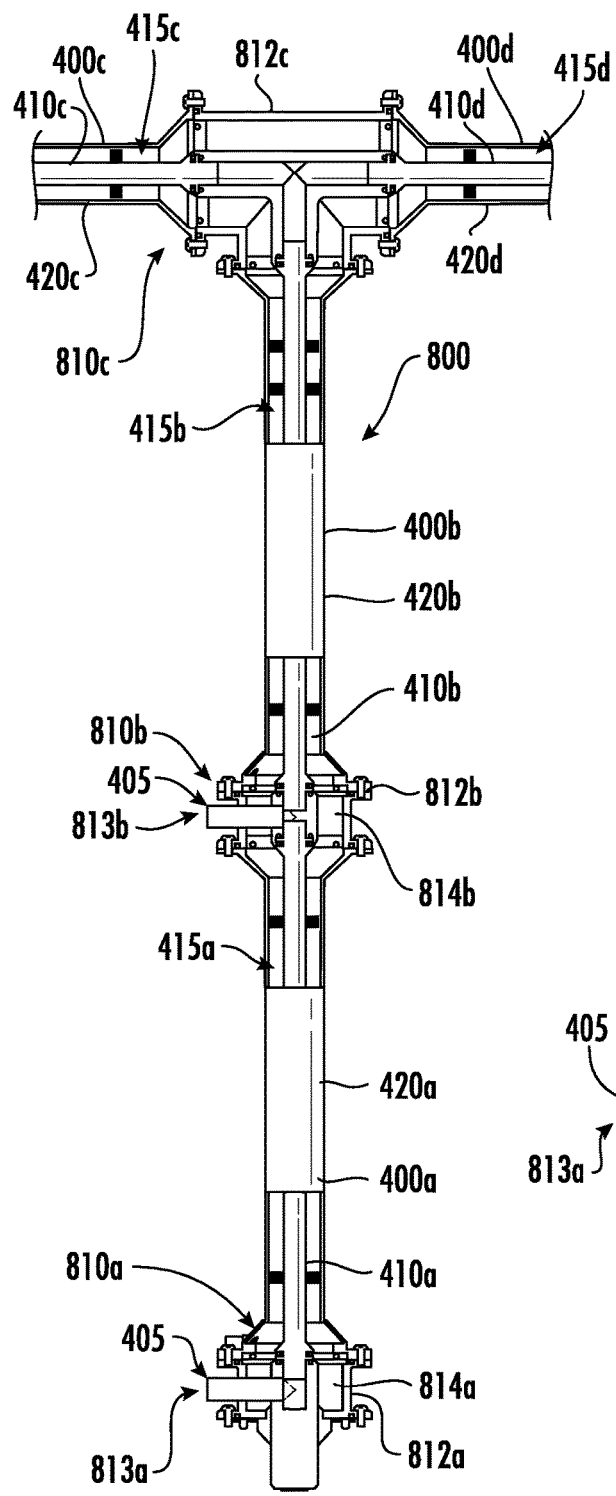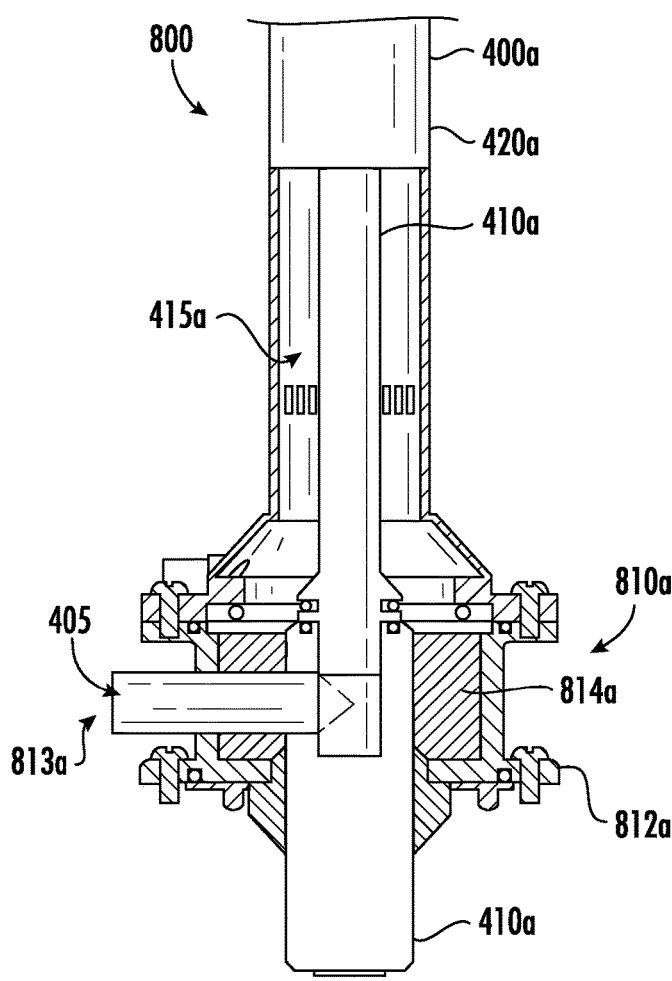
FIG. 10
FIG. 11

ELECTRIC COMPONENT FOR ELECTRIC POWER TRANSMISSION IN AN ELECTRIC SYSTEM

CROSS-REFERENCE TO RELATED APPLICATIONS

This application is a non-provisional application claiming the benefit of priority under 35 U.S.C. § 119(e) to U.S. Provisional Application No. 63/231,865, filed Aug. 11, 2021, which is hereby incorporated by reference in its entirety.

FIELD

The present disclosure relates to an electric component for an electric system.

BACKGROUND

Electric components for electric systems, such as electric powertrains, are frequently used for transmitting, storing, generating, and/or converting electric power. These electric components may facilitate various operations for the electric systems. The electric system, such as an electric powertrain, may be an electric propulsion system, such as an electric propulsion system for an aeronautical vehicle (e.g., an airplane), a marine vehicle, such as a ship or a submarine, or a land vehicle, such as a tank. The electric system may be a power grid, a power generation station, or an industrial application. With such a configuration, improvements to electric components for electric systems to allow for a desired operation would be welcomed in the art.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which:

FIG. 4 is a cross-sectional view of a cable in accordance with an exemplary embodiment of the present disclosure.

FIG. 5 is a cross-sectional view of a cable in accordance with an exemplary embodiment of the present disclosure.

FIG. 6 is a cross-sectional view of a cable in accordance with an exemplary embodiment of the present disclosure.

FIG. 7 is a cutaway, perspective view of a cable in accordance with an exemplary embodiment of the present disclosure.

FIG. 10 is a cutaway top view of a fluid cable system in accordance with an exemplary embodiment of the present disclosure.

FIG. 11 is a partial, cutaway top view of the fluid cable system of FIG. 10 in accordance with an exemplary embodiment of the present disclosure.

DETAILED DESCRIPTION

Figure 1:
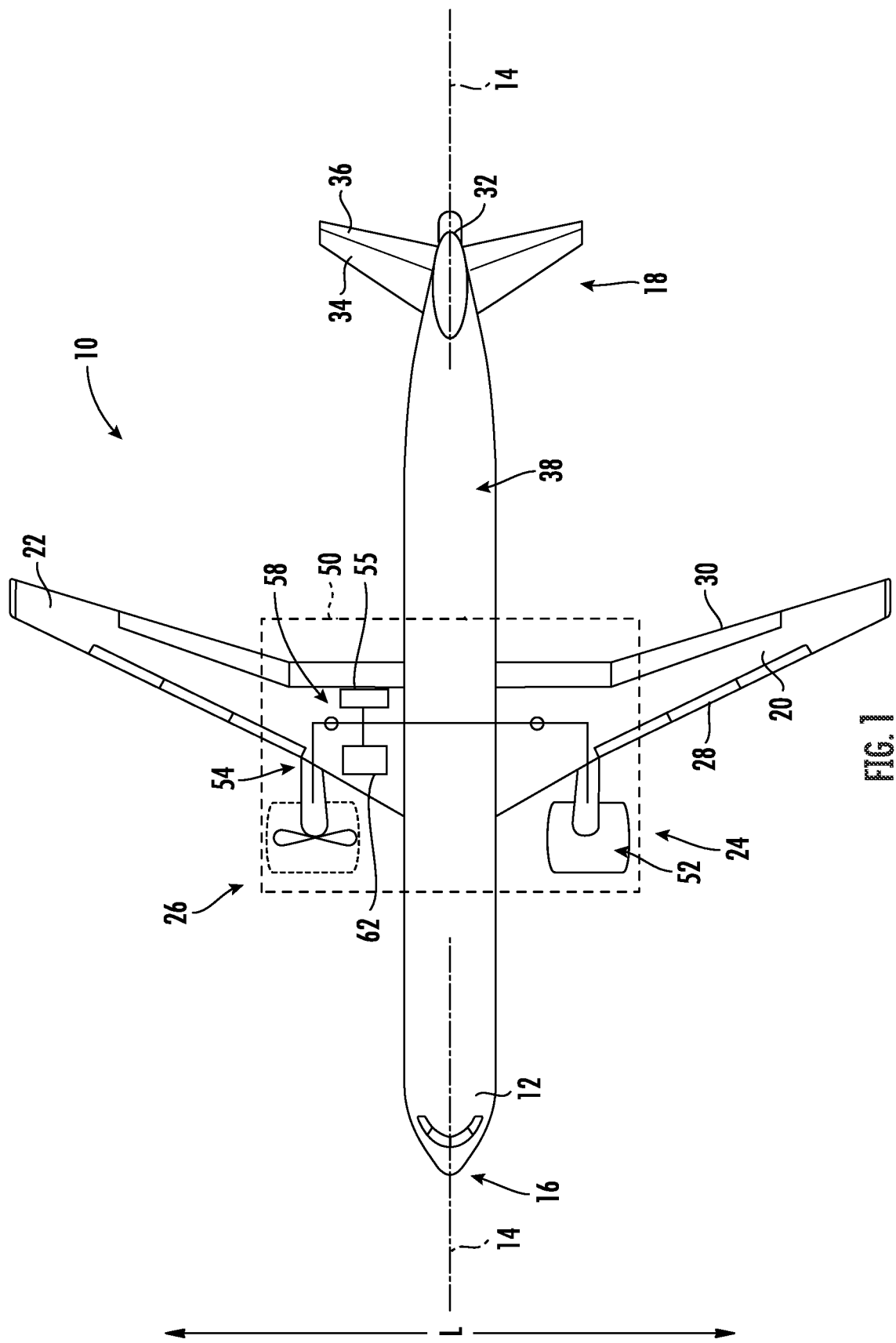
FIG. 1 is a top view of an aircraft in accordance with an exemplary embodiment of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first", "second", and "third" may be used interchangeably to distinguish one component from another and are not intended to signify location or importance of the individual components.

The terms "forward" and "aft" refer to relative positions within a gas turbine engine or vehicle and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

In accordance with one or more embodiments described herein, a cable includes a conductor defining a hollow interior, a casing surrounding the conductor, an electrical insulator positioned between the conductor and the casing, and a fluid positioned within the hollow interior of the conductor. The fluid may be a gas, a liquid, or a supercritical fluid. The fluid may be at single phase state (liquid, gaseous, or supercritical) or two-phase state (coexisting liquid and gaseous states). The fluid may be liquid natural gas, liquid hydrocarbons, or a cryogenic fluid such as liquid nitrogen (N2) or liquid hydrogen (H2). Incorporating a fluid within the cable has several benefits.

First, incorporating fluid within the cable can minimize a weight of the cable. For example, conductors of cables generate heat when electric power is transferred through them. To dissipate heat, a mass of the conductor can be increased, which increases the weight of the cable. However, when fluid is used to absorb heat away from the conductor, the mass of the conductor can be reduced, which may decrease the weight of the cable.

Second, incorporating fluid within the cable can increase the amount of electric power that can be transmitted through the cable. For example, electrical cables frequently have thermal limits to ensure the safety and reliability of the cables. These thermal limits correlate with an apparent power limit for the cable. Because the fluid may absorb heat away from the conductor of the cable, the apparent power limit, measured in megavolt amperes (MVA), can be increased.

In accordance with one or more embodiments described herein, the fluid is a supercritical carbon dioxide (CO2). One of the benefits of using supercritical CO2 as the fluid is that CO2's critical temperature of 304.13 K may be in a normal operating range for the electric component, which may be easy to control. Another main benefit of using supercritical CO2 is that CO2 has an extremely low viscosity like gas and a high density and specific heat capacity as a liquid; thus, supercritical CO2 provides very high heat transfer coefficients (the same order of magnitude of subcooled boiling 2-phase flow), which may increase the amount of cooling capability with low mass. In addition, it may have a relatively low toxicity and environmental impact.

In accordance with one or more embodiments described herein, the electrical insulator of the cable may be a pressurized gas, such as CO2. The electrical insulator could also be pressurized air, nitrogen (N2), helium, argon, hydrogen, fluorocarbons, hydrocarbons, sulfur hexafluoride or any electronegative gas, or any combination thereof. Incorporating the pressurized gas into the cable as the electrical insulator also has several benefits.

First, incorporating pressurized gas within the cable as the electrical insulator can reduce the affect that altitude has on the voltage capability of the cable. For example, when the cable is manufactured, a certain volume of gas may be introduced into the cable and the cavity that it is within may be sealed. Because the volume of the gas is sealed, the volume, along with the density, may be unaffected by altitude. Dielectric breakdown of a gas is determined by its density. Therefore, because the density of the pressurized gas may be unaffected by altitude, the dielectric breakdown of the gas may be unaffected by altitude. Because the dielectric breakdown of the gas may be unaffected, the voltage capability of the cable may also be unaffected by altitude.

Second, incorporating pressurized gas within the cable as the electrical insulator can reduce degradation by partial discharge at high altitude. For example, the insulating properties of air decrease as the altitude increases. For a cable that incorporates an electrical insulator that is not a pressurized fluid, air or other gas can be present within the electrical insulator. As such, because the breakdown voltage of air or any gas decreases as the altitude increases according to Paschen's law, the insulating properties of the electrical insulator also decrease. Therefore, because of the reduced insulating properties, the risk of a partial discharge of the cable increases as the altitude increases. However, for the cable that incorporates pressurized gas as the electrical insulator, the insulating properties of the pressurized gas may not decrease as the altitude increases. Therefore, the risk of a partial discharge of the cable may be unaffected by the altitude or affected less by the altitude.

In accordance with one or more embodiments, a propulsion system includes a rotary component, an electric motor mechanically coupled to the rotary component, and a fluid circulation system that includes a cable. The cable is electrically coupled to the electric motor and includes a conductor defining a hollow interior, a casing surrounding the conductor, an electrical insulator positioned between the conductor and the casing, and a fluid positioned within the hollow interior of the conductor. The fluid may be a gas, liquid, or a supercritical fluid. The fluid may be at single phase state (liquid, gaseous, or supercritical) or two-phase state (coexisting liquid and gaseous states). Incorporating the cable into the propulsion system has many benefits.

For example, incorporating the cable into the propulsion system can increase the amount of electric power that can be transferred to the electric motor. In one example, the cable can carry 5 MW power with a voltage of 5 kilovolts and 1000 Amperes and can have a current density of 11 ampere per square millimeter. As such, the thrust output and/or the weight of the aircraft can be increased.

In accordance with one or more embodiments described herein, an electric component for an electric powertrain includes a working component, a housing that encloses the working component, and an electrical insulator disposed between the housing and the working component. The electrical insulator of the electric component may be a pressurized gas, such as pressurized CO2. The electrical insulator could additionally or alternatively be pressurized air, nitrogen (N2), helium, argon, hydrogen, fluorocarbons, hydrocarbons, sulfur hexafluoride or any electronegative gas, or any combination thereof. Incorporating the pressurized gas into the electric component as the electrical insulator has several benefits.

First, incorporating pressurized gas within the electric component as the electrical insulator can reduce the effect that altitude has on the amount of electrical insulation achieved by the electrical insulator. For example, when the electric component is manufactured, a certain volume of gas may be introduced into the electric component and the cavity within the housing may be sealed. Because the volume of the gas is sealed, the volume, along with the density, may be unaffected by altitude. Dielectric breakdown of a gas is determined by its density. Therefore, because the density of the pressurized gas may be unaffected by altitude, the dielectric breakdown of the gas may be unaffected by altitude. Because the dielectric breakdown of the gas may be unaffected, the insulating properties of the electrical insulator of the electric component may also be unaffected by altitude.

Second, incorporating pressurized gas within the electric component as the electrical insulator can reduce degradation by partial discharge at high altitude. For example, the insulating properties of air decreases as the altitude increases. For an electric component that incorporates an electrical insulator that is not a pressurized fluid, air or other gas can be present within the electrical insulator. As such, because the breakdown voltage of air or any gas can decrease as the pressure decreases according to Paschen's law, and the pressure decreases as the altitude increases, the insulating properties of the electrical insulator can also decrease. Therefore, because of the reduced insulating properties, the risk of a partial discharge of the electric component increases as the altitude increases. However, for the electric component that incorporates pressurized gas as the electrical insulator, the insulating properties of the pressurized gas may not decrease as the altitude increases. Therefore, the risk of a partial discharge of the electric component may be unaffected by the altitude or affected less by the altitude.

Third, incorporating pressurized gas within the electric component as the electrical insulator may allow the electric component to remain useful even after an electrical discharge and/or the electric component experiences a fault current between the housing and the working component. For example, the insulating properties of the pressurized gas may be regenerated to regain the same insulation capabilities after an electric discharge, or after impurities are introduced between the working component and the housing. Therefore, the pressurized gas may give healing capabilities to the electric component, which may allow the electric component to remain functional after experiencing multiple severe faults, which otherwise may have been catastrophic.

In such a manner, it will be appreciated that the above configuration may be particularly useful when the electric component is incorporated into, e.g., an aeronautical propulsion system for an aeronautical vehicle.

Referring now to the drawings, wherein identical numerals indicate the same elements throughout the figures, FIG. 1 provides a top view of an exemplary aircraft 10 that may incorporate various embodiments of the present disclosure. As shown in FIG. 1, the aircraft 10 defines a longitudinal centerline 14 that extends therethrough, a lateral direction L, a forward end 16, and an aft end 18. Moreover, the aircraft 10 includes a fuselage 12, extending longitudinally from the forward end 16 of the aircraft 10 to the aft end 18 of the aircraft 10, and a wing assembly including a port side and a starboard side. More specifically, the port side of the wing assembly is a first, port side wing 20, and the starboard side of the wing assembly is a second, starboard side wing 22. The first and second wings 20, 22 each extend laterally outward with respect to the longitudinal centerline 14. The first wing 20 and a portion of the fuselage 12 together define a first side 24 of the aircraft 10, and the second wing 22 and another portion of the fuselage 12 together define a second side 26 of the aircraft 10. For the embodiment depicted, the first side 24 of the aircraft 10 is configured as the port side of the aircraft 10, and the second side 26 of the aircraft 10 is configured as the starboard side of the aircraft 10.

Each of the wings 20, 22 for the exemplary embodiment depicted includes one or more leading edge flaps 28 and one or more trailing edge flaps 30. The aircraft 10 further includes a vertical stabilizer 32 having a rudder flap (not shown) for yaw control, and a pair of horizontal stabilizers 34, each having an elevator flap 36 for pitch control. The fuselage 12 additionally includes an outer surface or skin 38. It should be appreciated however, that in other exemplary embodiments of the present disclosure, the aircraft 10 may additionally or alternatively include any other suitable configuration. For example, in other embodiments, the aircraft 10 may include any other configuration of stabilizer.

Figure 2:
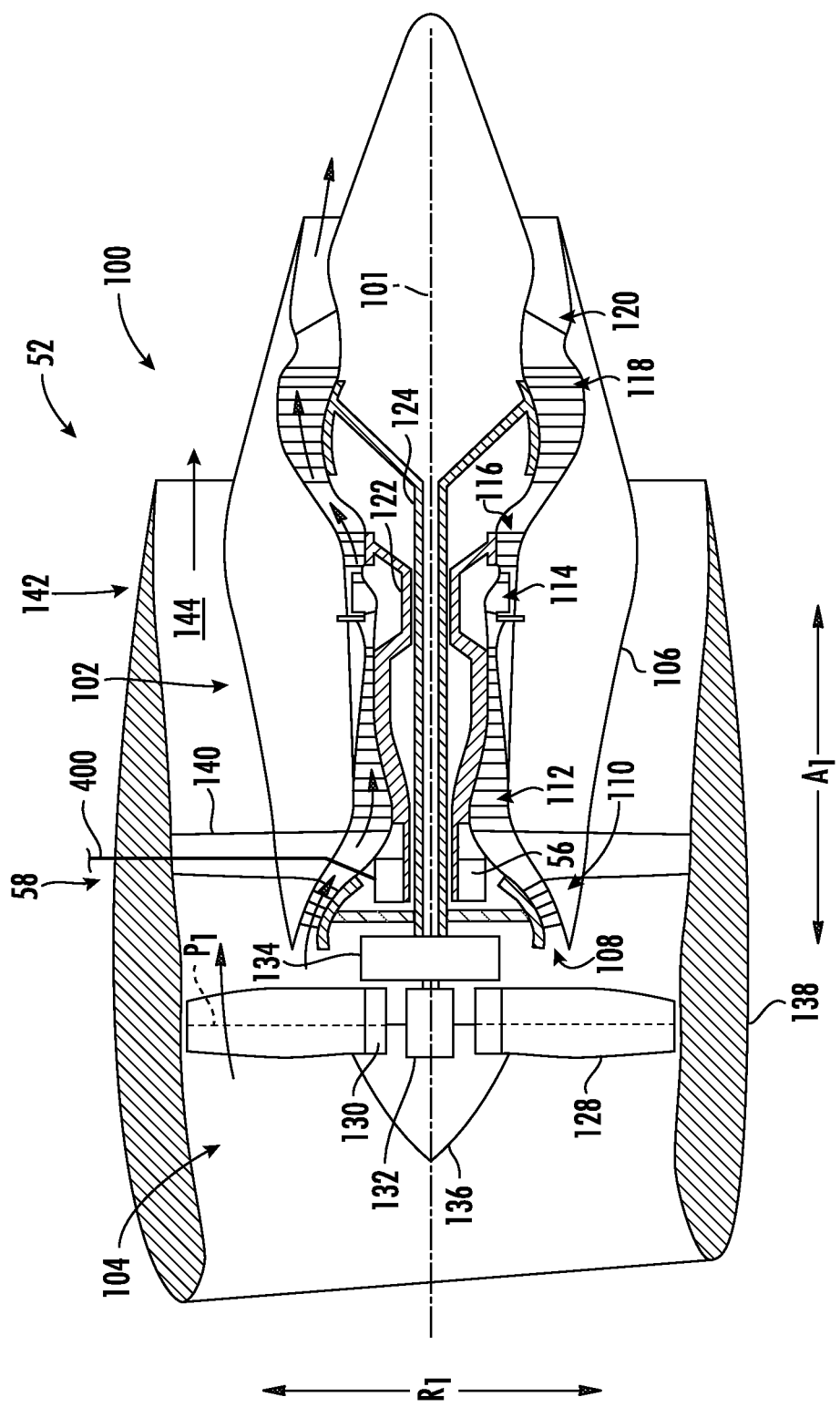
FIG. 2 is a schematic, cross-sectional view of a gas turbine engine in accordance with an exemplary embodiment of the present disclosure, which may be mounted to the exemplary aircraft of FIG. 1.
Figure 3:
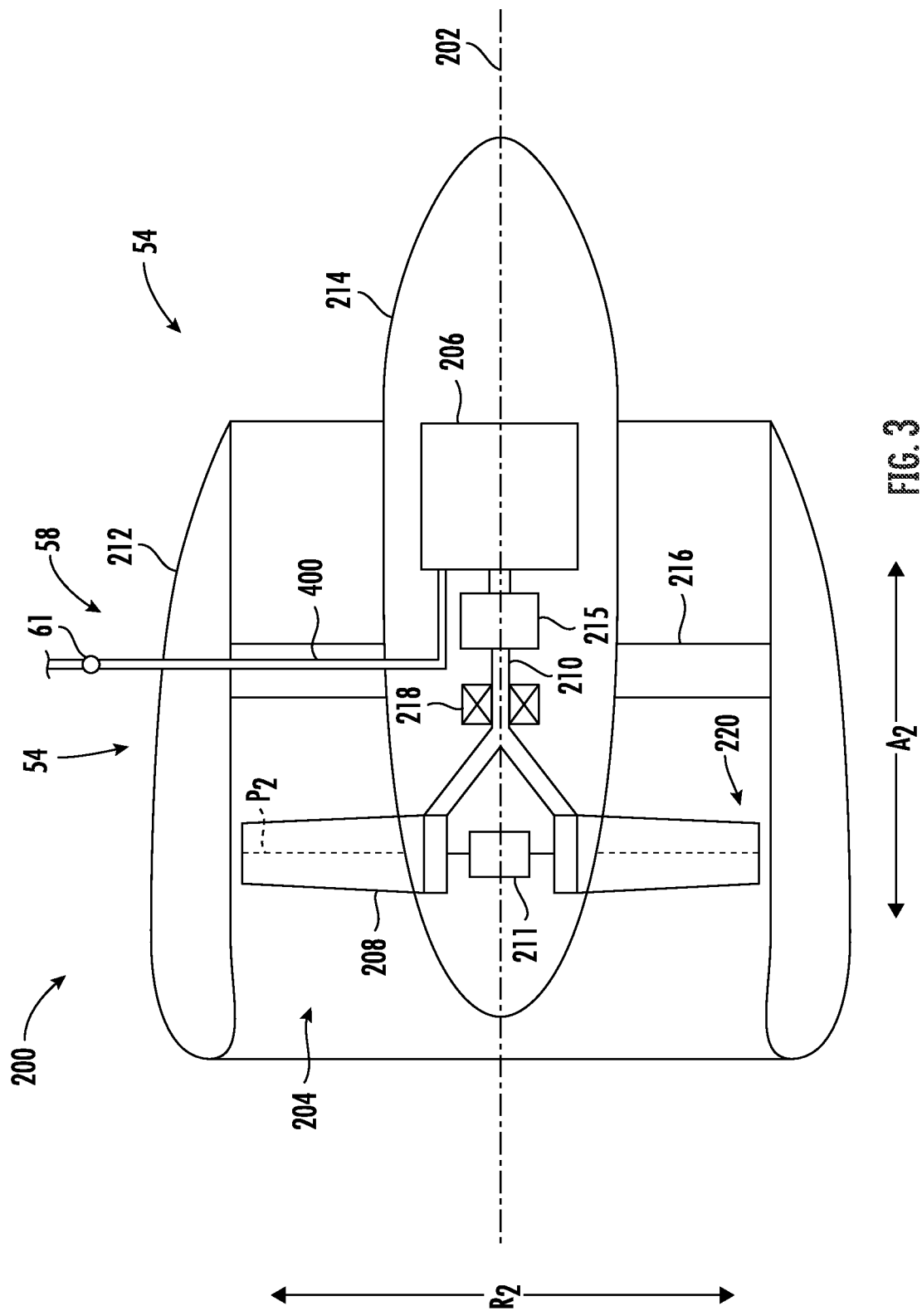
FIG. 3 is a schematic, cross-sectional view of an auxiliary propulsor assembly in accordance with an exemplary embodiment of the present disclosure, which may be mounted to the exemplary aircraft of FIG. 1.

Referring now also to FIGS. 2 and 3, the exemplary aircraft 10 of FIG. 1 additionally includes a propulsion system 50 having a first propulsor assembly 52 and a second propulsor assembly 54. FIG. 2 provides a schematic, cross-sectional view of the first propulsor assembly 52, and FIG. 3 provides a schematic, cross-sectional view of the second propulsor assembly 54. As is depicted, each of the first propulsor assembly 52 and second propulsor assembly 54 are configured as under-wing mounted propulsor assemblies.

Referring particularly to FIGS. 1 and 2, the first propulsor assembly 52 is mounted, or configured to be mounted, to the first side 24 of the aircraft 10, or more particularly, to the first wing 20 of the aircraft 10. The first propulsor assembly 52 generally includes a turbomachine 102 and a primary fan. More specifically, for the embodiment depicted the first propulsor assembly 52 is configured as a turbofan engine 100, with the primary fan being configured as a fan 104 operable with the turbomachine 102.

As shown in FIG. 2, the turbofan engine 100 defines an axial direction $A_1$ (extending parallel to a longitudinal centerline 101 provided for reference) and a radial direction $R_1$. As stated, the turbofan engine 100 includes the fan 104 and the turbomachine 102 disposed downstream from the fan 104.

The exemplary turbomachine 102 depicted generally includes a substantially tubular outer casing 106 that defines an annular inlet 108. The outer casing 106 encases, in serial flow relationship, a compressor section including a booster or low pressure (LP) compressor 110 and a high pressure (HP) compressor 112; a combustion section 114; a turbine section including a first, high pressure (HP) turbine 116 and a second, low pressure (LP) turbine 118; and a jet exhaust nozzle section 120.

The exemplary turbomachine 102 of the turbofan engine 100 additionally includes one or more shafts rotatable with at least a portion of the turbine section and, for the embodiment depicted, at least a portion of the compressor section. More particularly, for the embodiment depicted, the turbofan engine 100 includes a high pressure (HP) shaft or spool 122, which drivingly connects the HP turbine 116 to the HP compressor 112. Additionally, the exemplary turbofan engine 100 includes a low pressure (LP) shaft or spool 124, which drivingly connects the LP turbine 118 to the LP compressor 110.

As stated above, the primary fan of the first propulsor assembly 52 is configured as the fan 104 for the embodiment depicted. Further, the exemplary fan 104 depicted is configured as a variable pitch fan having a plurality of fan blades 128 coupled to a disk 130 in a spaced apart manner. The fan blades 128 extend outwardly from disk 130 generally along the radial direction $R_1$. Each fan blade 128 is rotatable relative to the disk 130 about a respective pitch axis P by virtue of the fan blades 128 being operatively coupled to a suitable actuation member 132 configured to collectively vary the pitch of the fan blades 128. The fan 104 is mechanically coupled to the LP shaft 124. More particularly, the fan 104, including the fan blades 128, disk 130, and actuation member 132, is mechanically coupled to the LP shaft 124 through a power gearbox 134, and is rotatable about the longitudinal centerline 101 by the LP shaft 124 across the power gearbox 134. The power gearbox 134 includes a plurality of gears for stepping down the rotational speed of the LP shaft 124 to a more efficient rotational fan speed. Accordingly, the fan 104 is powered by an LP system (including the LP turbine 118) of the turbomachine 102.

Referring still to the exemplary embodiment of FIG. 2, the disk 130 is covered by rotatable front hub 136 aerodynamically contoured to promote an airflow through the plurality of fan blades 128. Additionally, the turbofan engine 100 includes an annular fan casing or outer nacelle 138 that circumferentially surrounds the fan 104 and/or at least a portion of the turbomachine 102. Accordingly, the exemplary turbofan engine 100 depicted may be referred to as a "ducted" turbofan engine. It should be appreciated that the nacelle 138 is configured to be supported relative to the turbomachine 102 by a plurality of circumferentially spaced outlet guide vanes 140. Moreover, a downstream section 142 of the nacelle 138 extends over an outer portion of the turbomachine 102 so as to define a bypass airflow passage 144 therebetween.

Referring still to FIG. 2, the propulsion system 50 additionally includes an electric machine 56, which for the embodiment depicted is configured as an electric generator 56. The electric generator 56 is, for the embodiment depicted in FIG. 2, positioned within the turbomachine 102 of the turbofan engine 100 and is in mechanical communication with one of the shafts of the turbofan engine 100. More specifically, for the embodiment depicted in FIG. 2, the electric generator 56 is driven by the first, HP turbine 116 through the HP shaft 122. The electric generator 56 is configured to convert mechanical power of the HP shaft 122 to electric power. Accordingly, the electric generator 56 is powered by an HP system (including the HP turbine 116) of the turbomachine 102.

Referring still to FIGS. 1 and 2, the propulsion system 50 depicted additionally includes an electrical power bus 58 to allow the electric generator 56 to be in electrical communication with one or more other components of the propulsion system 50 and/or the aircraft 10. For the embodiment depicted in FIGS. 1 and 2, the electrical power bus 58 includes one or more electrical cables 400 connected to the electric generator 56, and, for the embodiment depicted in FIGS. 1 and 2, extending through one or more of the outlet guide vanes 140. Additionally, the propulsion system 50 depicted further includes one or more energy storage devices 55 (such as one or more batteries or other electrical energy storage devices) electrically connected to one or more cables 400 of the electrical power bus 58 for, e.g., providing electric power to the second propulsor assembly 54, which, in this example, is an electric propulsor assembly, and/or receiving electric power from the gas turbine engine/first propulsion system 52. In certain exemplary embodiments, the one or more energy storage devices 55 may be positioned proximate the second propulsor assembly 54 for weight distribution purposes. Inclusion of the one or more energy storage devices 55 may provide performance gains and may increase a propulsion capability of the propulsion system 50 during, e.g., transient operations. More specifically, the propulsion system 50 including one or more energy storage devices 55 may be capable of responding more rapidly to speed change demands.

It should be appreciated, however, that in other embodiments, the electric generator 56 may be positioned within the turbomachine 102, or elsewhere. For example, the electric generator 56 may be, in other embodiments, an electric motor or an electric motor/generator, and may be mounted coaxially with the HP shaft 122 within the turbine section, or alternatively may be offset from the HP shaft 122 and driven through a suitable gear train. Additionally, or alternatively, the electric generator 56 may be driven by both the LP system (e.g., the LP shaft 124) and the HP system (e.g., the HP shaft 122) via a dual drive system. For example, a gear assembly, such as an epicyclic gear assembly, may be provided to allow both the LP shaft 124 and HP shaft 122 to drive the electric generator 56. Additionally, or alternatively still, in various other exemplary embodiments, the electric machine/electric generator 56 may instead be operable with just the LP system.

It should further be appreciated that the exemplary turbofan engine 100 depicted in FIG. 2 may, in other exemplary embodiments, have any other suitable configuration. For example, in other exemplary embodiments, the fan 104 may not be a variable pitch fan, and further, in other exemplary embodiments, the LP shaft 124 may be directly mechanically coupled to the fan 104 (i.e., the turbofan engine 100 may not include the power gearbox 134). Further, it should be appreciated, that in other exemplary embodiments, the turbofan engine 100 may instead be configured as any other suitable aircraft engine including a turbomachine mechanically coupled to a primary fan. For example, in other embodiments, the turbofan engine 100 may instead be configured as a turboprop engine (i.e., the primary fan may be configured as a propeller), an unducted turbofan engine (i.e., the gas turbine engine may not include the outer nacelle 138), etc.

Referring now particularly to FIGS. 1 and 3, the exemplary propulsion system 50 additionally includes the second propulsor assembly 54 positioned, or configured to be positioned, at a location spaced apart from the first propulsor assembly 52 (including, e.g., the turbomachine and the primary fan). More specifically, for the embodiment depicted in FIGS. 1 and 3, the second propulsor assembly 54 is mounted at a location away from the first propulsor assembly 52 along the lateral direction L such that they ingest different airstreams along the lateral direction L. However, in other embodiments, the first and second propulsor assemblies 52, 54 may each be mounted to the aircraft 10 using a common mount. With such a configuration, however, the first and second propulsor assemblies 52, 54 may still be positioned on the mount such that they are spaced apart from one another, e.g., along the lateral direction L such that they ingest different airstreams along the lateral direction L. Referring still to the exemplary embodiments of FIGS. 1 and 3, the second propulsor assembly 54 is mounted to one of the first side 24 or second side 26 of the aircraft 10, e.g., to one of the first wing 20 or the second wing 22 of the aircraft 10. Notably, for the embodiment depicted in FIG. 1, the second propulsor assembly 54 is mounted to the second side 26 of the aircraft 10, or rather to the second wing 22 of the aircraft 10.

Referring particularly to FIG. 3, the second propulsor assembly 54 is generally configured as an auxiliary propulsor assembly 200, defining an axial direction A2 extending along a longitudinal centerline axis 202 that extends therethrough for reference, as well as a radial direction R2. Additionally, the auxiliary propulsor assembly 200 generally includes an auxiliary fan 204 and an electric machine 56, which, for the embodiment depicted in FIG. 3, is configured as an electric motor 206. For the embodiment depicted in FIG. 3, the auxiliary fan 204 is rotatable about the centerline axis 202. The auxiliary fan 204 includes a plurality of fan blades 208 and a fan shaft 210. The plurality of fan blades 208 are attached to/rotatable with the fan shaft 210 and spaced generally along a circumferential direction of the auxiliary propulsor assembly 200 (not shown in the example view of FIG. 3).

In certain exemplary embodiments, the plurality of fan blades 208 may be attached in a fixed manner to the fan shaft 210, or alternatively, the plurality of fan blades 208 may be rotatable relative to the fan shaft 210, such as in the embodiment depicted in FIG. 3. For example, the plurality of fan blades 208 each define a respective pitch axis P2 and are attached to the fan shaft 210 such that a pitch of each of the plurality of fan blades 208 may be changed, e.g., in unison, by a pitch change mechanism 211. Changing the pitch of the plurality of fan blades 208 may increase an efficiency of the second propulsor assembly 54 and/or may allow the second propulsor assembly 54 to achieve a desired thrust profile. With such an exemplary embodiment, the fan 204 may be referred to as a variable pitch fan.

Moreover, for the embodiment depicted in FIG. 3, the auxiliary propulsor assembly 200 depicted additionally include a fan casing or outer nacelle 212, attached to a core 214 of the auxiliary propulsor assembly 200 through one or more struts or outlet guide vanes 216. For the embodiment depicted in FIG. 3, the outer nacelle 212 substantially completely surrounds the fan 204, and particularly the plurality of fan blades 208. Accordingly, for the embodiment depicted in FIG. 3, the auxiliary propulsor assembly 200 may be referred to as a ducted electric fan assembly.

Referring still particularly to FIG. 3, the electric motor 206 can be mechanically coupled to a rotary component. For example, the electric motor 206 can be mechanically coupled to the fan shaft 210, such that the electric motor 206 drives the auxiliary fan 204 through the fan shaft 210. It should be understood that the rotary component can be any component that has a rotating portion. For example, the rotary component can be a low pressure compressor, an auxiliary compressor, or a booster compressor.

For the embodiment depicted in FIG. 3, the electric motor 206 is configured as a variable speed electric motor, such that the electric motor 206 may drive the auxiliary fan 204 at various rotational speeds despite an amount of power provided thereto. Additionally, for the embodiment depicted in FIG. 3, the auxiliary propulsor assembly 200 additionally includes an auxiliary propulsor gearbox 215 allowing for the rotational speed of the fan shaft 210 to be further increased or decreased relative to a rotational speed of the electric motor 206. Accordingly, for the embodiment depicted in FIG. 3, the electric motor 206 further drives the auxiliary fan 204 across the auxiliary propulsor gearbox 215 and through the fan shaft 210.

Notably, however, in certain exemplary embodiments, the electric motor 206 may be configured as a motor/generator. Accordingly, during, e.g., emergency operations, the auxiliary propulsor assembly 200 may operate as a ram air turbine, such that inlet air to the auxiliary propulsor assembly 200 rotates the plurality of fan blades 208 of the fan 204, in turn rotating the electric motor/generator, allowing the electric motor/generator to operate as an electric generator 56 providing electric power to the electrical power bus 58. Notably, with such an exemplary embodiment, the electric generator 56 of the turbofan engine 100 of FIG. 2 instead operates as an electric motor configured to receive power from the auxiliary propulsor assembly 200 and drive the turbomachine 102. Moreover, it should be appreciated, that in other exemplary embodiments, the electric generator 56 may additionally be operable as an electric motor to receive energy from a ground (or other external) power source for e.g., starting the turbofan engine 100, and/or from an energy storage device 55, such as an electric battery, within the turbofan engine 100 or aircraft 10 for powering the turbofan engine 100.

The fan shaft 210 is supported by one or more bearings 218, such as the one or more roller bearings, ball bearings, or any other suitable bearings. Additionally, the electric motor 206 may be an inrunner electric motor (i.e., including a rotor positioned radially inward of a stator), or alternatively may be an outrunner electric motor (i.e., including a stator positioned radially inward of a rotor). As briefly noted above, the electric generator 56 of the propulsion system 50 is in electrical communication with the auxiliary propulsor assembly 200 for powering the auxiliary propulsor assembly 200. More particularly, the electric motor 206 of the auxiliary propulsor assembly 200 is in electrical communication with the electrical power bus 58. The electrical power bus 58 includes one or more cables 400 for electric power transmission. In the embodiment depicted in FIG. 3, a cable 400 is electrically connected to the electric motor 206. Accordingly, the electric motor 206 is more particularly in electrical communication with the electrical power bus 58 through one or more electrical cables 400 of the electrical power bus 58, and the electrical power bus 58 may deliver electric power to the electric motor 206 for driving the electric motor 206, and in turn driving the fan 204. Notably, for the embodiment depicted in FIG. 3, the electrical power bus 58 further includes one or more electrical disconnects 61, such that the electrical power bus 58 may isolate one or more components in the event of an electrical failure of one or more components. The one or more electrical disconnects 61 may be manually operated, or alternatively, may be automatically triggered in the event of an electrical failure.

Referring again briefly to FIG. 1, the propulsion system 50 depicted, or rather, the electrical power bus 58 depicted, additionally includes an electric controller 62. The exemplary electric generator 56 depicted is in electrical communication with the auxiliary propulsor assembly 200 through the electric controller 62 of the electrical power bus 58. The electric controller 62 may be operably connected to one or more additional controllers of the aircraft 10, for controlling an amount of electric power provided to the auxiliary propulsor assembly 200.

It should be understood that other configurations for propulsion system 50 are contemplated. For example, the various examples of propulsion system 50 provided in U.S. application Ser. No. 15/430,052 filed Feb. 10, 2017, which is hereby incorporated by reference in its entirety, are contemplated. As another example, the various examples of propulsion system 100 provided in U.S. application Ser. No. 15/242,844 filed Aug. 22, 2016, which is hereby incorporated by reference in its entirety, are contemplated. Moreover, it will be appreciated that the exemplary propulsion system 50 depicted is by way of example only, and that in other example embodiments, any other suitable propulsion system may be provided. For example, in other exemplary embodiments, the propulsion system 50 may include any suitable number and/or configuration of propulsion assemblies, mounted to the aircraft 10 at any other suitable location (e.g., blended wing, empennage mounted, fuselage mounted, etc.). Further, although the exemplary propulsion system 50 depicted includes an all-electric propulsion assembly (see, e.g., FIG. 3), in other embodiments, the exemplary propulsion system 50 may include a turbomachine. Additionally, the term "electrical propulsion system" can refer to all-electric propulsion assemblies or hybrid-electric propulsion assemblies. Further, still, although the exemplary propulsion system 50 is depicted as being incorporated into a fixed wing aircraft, in other embodiments, the propulsion system 50 may be used with any other aeronautical vehicle, or further with any land-based vehicle, marine vehicle, etc.

As mentioned, the propulsion system 50 includes one or more cables 400 for electric power transmission. Referring now to FIG. 4, a cross-sectional view of a cable 400 in accordance with an exemplary embodiment of the present disclosure is shown. The cable 400 defines a longitudinal direction L (going in and out of the page) and a radial direction R. The cable 400 includes a conductor 410 defining a hollow interior and a casing 420 that surrounds the conductor 410. As used herein in relation to the conductor 410, the term "hollow interior" refers to the cavity within the conductor 410. Additionally, the term "surrounds" and "surrounding" refers to enclosing completely at least in a cross-sectional plane.

In this example, the conductor 410 and the casing 420 are cylindrical tubes that have circular-shaped cross-sections. However, it should be understood that the conductor 410 and the casing 420 can be any shape. For example, the conductor 410 and the casing 420 can be elliptic cylindrical tubes such that they have an oval-shaped cross-section.

The conductor 410 can be manufactured from any material that has a relatively high electrical conductivity; for example, has an electrical conductivity of at least $1 \times 10^7$ Siemens/meter (S/m) at 20° C. and up to $7 \times 10^7$. For example, the conductor 410 can be manufactured from an aluminum alloy, such as grade 6061 aluminum alloy. In other examples, the conductor 410 can be manufactured from copper; copper alloys such as silver cladded Cu, Ni cladded Cu, Al cladded Cu; carbon nanotubes; metal composites such as CNT-Cu, CNT-Al, CNT-Fe, etc.; graphene-metal composites such as graphene Cu, graphene Al titanium, or gold.

The casing 420 can be manufactured from any material that provides for electromagnetic interference (EMI) protection. For example, the casing 420 can be manufactured from a metal. For example, the casing 420 can be manufactured from an aluminum alloy, such as grade 6061 aluminum alloy. In other examples, the casing 420 can be manufactured from copper, titanium, pre-tin plated steel, or gold. In yet other examples, the casing 420 can be manufactured from a ceramic composite, such as a composite with a ceramic matrix phase and a conductive or EMI shielding material filler. In still yet another example, the casing 420 can be manufactured from a carbon composite, such as a composite with a polymer matrix phase and a carbon filler, such as carbon fiber, carbon nanotubes, or metallized fibers.

The cable 400 also includes an electrical insulator 415 that is positioned between the conductor 410 and the casing 420. The electrical insulator 415 can be any material or substance that provides electrical insulation between the conductor 410 and the casing 420. For example, the electrical insulator 415 can have a volume resistivity of at least $10^8$ ohm-cm at 25° C. and up to $10^{15}$ ohm-cm at 25°. In at least one example, the electrical insulator 415 is a pressurized fluid.

For example, the electrical insulator 415 can be a pressurized gas or liquid. More specifically, in at least certain exemplary embodiments, the electrical insulator 415 may be a pressurized carbon dioxide ($CO_2$). In other exemplary embodiments, the electrical insulator 415 may be pressurized air, nitrogen ($N_2$), helium, argon, hydrogen, fluorocarbons, hydrocarbons, sulfur hexafluoride, and/or any electronegative gas, or a combination thereof. The electrical insulator 415 can have a pressure of at least 0.1 megapascal (MPa) and up to 2 MPa.

In another example, the electrical insulator 415 may be a solid. For example, the electrical insulator 415 can be a ceramic tape, paper, polymer or a plastic, such as a semi-crystalline polymer, a fluoropolymer, an amorphous plastic, a thermosetting polymer, or a thermoplastic. More specifically, the electrical insulator 415 can be polytetrafluoroethylene, polyamide-imide, polyimide, polyetherimide, polyester, polyethylene, polypropylene or polyetheretherketone. The electrical insulator 415 can be polyamide paper, kraft paper, mica tape, or alumina and boron nitride tape, or glass tape.

In one or more of these examples, the electrical insulator 415 may substantially completely fill a space between the casing 420 and the conductor 410. For example, the electrical insulator 415 may fill at least ninety percent, such as at least ninety-five percent, such as at least ninety-eight percent and up to ninety-nine percent of the space between the casing 420 and the conductor 410. More specifically, in one or more of these examples, the electrical insulator 415 may completely fill the space between the casing 420 and the conductor 410.

Referring still to the example of FIG. 4, the cable 400 includes a fluid 405 positioned within the hollow interior of the conductor 410. More specifically, for the example of FIG. 4, the cable 400 includes a fluid 405 positioned within the hollow interior of the conductor 410 that is a supercritical fluid. A supercritical fluid is a substance that is at a temperature and pressure above its critical temperature and above its critical pressure. Supercritical fluids have relatively high densities like that of liquids and relatively low dynamic viscosities like that of gases. As such, supercritical fluids have high thermal conductivity, for example higher than a fluid in its gas state, due to their relatively high densities, and low frictional coefficients due to their relatively low viscosities. Also, supercritical fluids have a high specific thermal capacity, for example, higher than a fluid in its gas state and higher than a fluid it is liquid state Because of the high thermal conductance and specific thermal capacity of the fluid 405, especially when the fluid 405 is a supercritical fluid, the fluid 405 may efficiently absorb heat from the conductor 410 when electric power is being transmitted by the conductor 410. As such, because the conductor 410 does not need to dissipate as much heat, a thickness 412 of the conductor 410 can be reduced, which may reduce its weight.

Because of the low frictional coefficient of the fluid 405, especially when the fluid 405 is a supercritical fluid, the fluid 405 may travel easily through the conductor 410, especially when the fluid 405 is a flow of a supercritical fluid. As such, the size of and the amount of energy used by a pump to circulate the fluid 405 may be minimized.

In at least one example, the fluid 405 is a supercritical $CO_2$. As a person of skill in the art will recognize, $CO_2$ transitions to a supercritical fluid when its temperature exceeds its critical temperature of 304.13 Kelvin (K) and when its pressure exceeds its critical pressure at 7.3773 MPa. One of the benefits of using supercritical $CO_2$ as the fluid 405 is that $CO_2$'s low critical temperature of 304.13 K may be easy to achieve under normal operating conditions of the electric system, such as electric system 700 (FIG. 12), that the cable 400 is installed on. Therefore, achieving $CO_2$'s phase change into a supercritical fluid may be easy to achieve. Additionally, the low critical temperature of $CO_2$ may increase the amount of cooling provided by the fluid 405 when the fluid 405 is supercritical $CO_2$.

Referring now to FIG. 5, a cross-sectional view of a cable 400 in accordance with another exemplary embodiment of the present disclosure is shown. The exemplary cable 400 of FIG. 5 may be configured in substantially the same manner as the exemplary cable 400 of FIG. 4. In this example, however, the cable 400 includes spacers 417 positioned between and coupled to the conductor 410 and the casing 420. The spacers 417 are included in this embodiment to allow the conductor 410 to remain spaced apart from the casing 420. Even though two spacers 417 are shown in this cross-sectional view, it should be understood that the cable 400 can include any number of spacers 417. For example, referring now to FIG. 6, providing a cross-sectional view of a cable 400 in accordance with yet another exemplary embodiment of the present disclosure, the cable 400 includes four spacers 417. In other examples, however, the cable 400 may include three, five, six, or more spacers 417 (e.g., up to 30 spacers 417). Notably, the number of spacers 417 refers to the number of spacers 417 in a single cross-sectional plane of the cable 400 (e.g., a set of spacers 417). As will be appreciated from the description and Figures herein, the cable 400 may include multiple sets of spacers 417 arranged along a length of the cable 400.

The spacers 417 can be manufactured from an electrically insulating material with a relatively high temperature capability. For example, the spacers 417 can be manufactured from a ceramic such as alumina, a machinable glass ceramic material, boron nitride, aluminum nitride, cordierite, or steatite. In other examples, the spacers 417 can be manufactured from a polymer or a plastic, such as a semi-crystalline polymer, a fluoropolymer, an amorphous plastic, a thermosetting polymer, or a thermoplastic. More specifically, the spacers 417 can be polyamide-imide, polytetrafluoroethylene or polyetheretherketone. In some examples, the spacers 417 are a glass or ceramic composite with polymers, such as polyamide-imide, polytetrafluoroethylene, polyetheretherketone, silicone or epoxy resins.

Referring now to FIG. 7, a cutaway perspective view of a cable 400 in accordance with still another exemplary embodiment of the present disclosure is shown. The exemplary cable 400 of FIG. 7 may be configured in substantially the same manner as one or more of the exemplary cables 400 of FIGS. 4 through 6. As depicted, each spacer 417 can extend partially along the length of the cable 400, along the longitudinal direction L. Additionally, each spacer 417 can have a smooth surface and can have any shape. The shape of the spacer 417 may provide for long creepage distances and reduced electric stresses along the surface and at triple points. For example, a spacer 417 can be right rectangular prism shaped or cylindrically shaped (such as in the embodiment shown in FIG. 7). Each spacer 417 within the cable 400 can be the same shape or at least one of a plurality of spacers 417 can have a different shape than the other spacers 417 of the plurality of spacers 417. The spacers 417 can be located intermittently along the length of the cable 400, as shown, or can extend the full length of the cable 400.

In the examples of FIGS. 4 through 7, specific dimensions have been shown. However, it should be understood that a variety of additional dimensions for the casing 420, electrical insulator 415, and/or conductor 410 are contemplated. For example, the inner diameter 411 of the conductor 410 can be chosen to allow for a sufficient amount of cooling from the fluid 405. For example, the inner diameter 411 of the conductor 410 can be at least 2 millimeters (mm), such as at least 3 mm, such as at least 4 mm, such as at least 5 mm, such as at least 6 mm, and up to 50 mm, such as up to 40 mm, such as up to 30 mm, such as up to 20 mm. The thickness 412 of the conductor 410 can be chosen to allow for a current density of at least 8 Ampere per square millimeter ($A/mm^2$), such as at least 9 $A/mm^2$, such as at least 10 $A/mm^2$, such as at least 11 $A/mm^2$ and up to 40 $A/mm^2$, such as up to 30 $A/mm^2$, such as up to 20 $A/mm^2$.

Choosing the thickness 412 of the conductor 410 to allow for a current density of at least 8 $A/mm^2$ while having sufficient mechanical strength to hold the pressure for fluid 405 when the conductor 410 is an aluminum alloy with an ID of at least 3 mm and up to 6 mm, such as between 4 mm and 5 mm, can result in a thickness 412 that is between 4 mm and 10 mm, such as between 5 mm and 9 mm, such as between 6 mm and 8 mm, such as 7 mm.

The inner diameter 421 of the casing 420 can be chosen to accommodate for a minimum amount of electrical insulation provided by the electrical insulator 415 that is positioned between the conductor 410 and the casing 420. For example, the inner diameter 421 can be at least 10 mm, such as at least 15 mm, such as at least 20 mm, such as at least 25 mm, such as at least 30 mm, such as at least 35 mm, and further may be up to 200 mm, such as up to 100 mm, such as up to 50 mm. The thickness 422 of the casing 420 can be chosen to provide a minimum amount of EMI shielding. For example, the thickness 422 can be at least 1 mm, such as at least 2 mm, such as at least 3 mm, such as up to 20 mm, such as up to 10 mm. In one example, the casing 420 is manufactured from an aluminum alloy and has an inner diameter 421 between 30 mm and 34 mm, such as 32 mm, and a thickness 422 between 1 mm and 3 mm, such as 2 mm.

Figure 8:
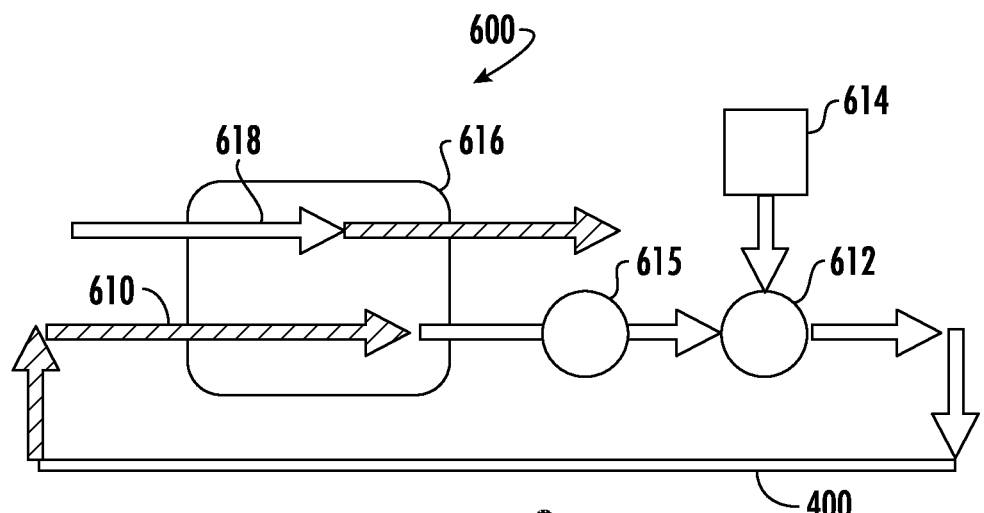
FIG. 8 is a schematic view of a fluid circulation system in accordance with an exemplary embodiment of the present disclosure.

Referring now to FIG. 8, a schematic view of a fluid circulation system 600 in accordance with an exemplary embodiment of the present disclosure is shown. The fluid circulation system 600 can be configured to provide a flow of fluid 405 through a cable 400, such as the cables 400 described in reference to FIGS. 4 through 7. In one example, the fluid circulation system 600 is configured to provide a flow of fluid 405 (see, e.g., FIGS. 4-7) that has a flow speed of at least two meters per second and up to fifty meters per second.

The fluid circulation system 600 can include a heat exchanger 616 and a coolant fluid flowpath 618 extending through the heat exchanger 616. The fluid circuit 610 can extend through the heat exchanger 616 and a hollow interior of the conductor 410 (see, e.g., FIGS. 4-7) of the cable 400. A pump 612 in fluid communication with the fluid circuit 610 can be provided to move the fluid 405, which creates a flow of fluid 405 through the hollow interior of the conductor 410 of the cable 400 (see, e.g., FIGS. 4 through 7). A tank 614 is provided in this embodiment to store the fluid 405. A pressure changing device, such as a piston 615, is also provided in this embodiment to adjust a pressure of the fluid 405.

In one example, the tank 614 stores the fluid 405 in a liquid state and the fluid 405 is transitioned to be a supercritical fluid by increasing the pressure and temperature of the fluid 405 above its critical temperature and critical pressure. For example, the substance stored within the tank 614 can be pressurized above its critical pressure. To heat the substance above its critical temperature, power can be provided to the conductor 410 of the cable 400, which creates heat that is absorbed by the fluid 405. The absorption of heat by the fluid 405 may cause the fluid 405 to incur a phase change into a supercritical fluid. In such a manner, it will be appreciated that between operation of the fluid circulation system 600, or during, e.g., a low power operation of the fluid circulation system 600, the fluid 405 within the hollow interior of the conductor 410 of the cable 400 may be in a liquid or gas state and may transition to a supercritical state as the fluid circulation system 600 begins operation or begins a higher power operation.

In operation, the fluid circulation system 600 can circulate the fluid 405 within the cable 400. As the fluid 405 flows through the conductor 410 of the cable 400, it absorbs heat away from the conductor 410 of the cable 400. This heat can be transferred away from the cable 400 by transferring the heat from the fluid 405 within the fluid circuit 610 to the coolant fluid flowpath 618 that extends through the heat exchanger 616. More specifically, the coolant fluid flowpath 618 and the fluid circuit 610 are in thermal communication through the heat exchanger 616. As such, the coolant fluid flowpath 618 absorbs heat from the fluid circuit 610.

The heat exchanger 616 can be any suitable type of heat exchanger. For example, a parallel-flow, a counter-flow, or a cross-flow heat exchanger, to name a few. The coolant fluid flowpath 618 can include a relatively cool fluid. For example, the relatively cool fluid can be air bled from a compressor section of a gas turbine engine, such as LP compressor 110 of turbomachine 102. In other examples, the relatively cool fluid could be captured, at cruise or generally speaking "high" speed, through an intake situated at the forward section of the fuselage or at the leading edge region of the aircraft's wings.

In some examples, the fluid 405 can transition from being a supercritical fluid to being a gas, and vice-versus. For example, the heat exchanger 616 may cool the fluid 405 so that it transitions into a gas state. Downstream, however, the fluid 405 may be heated by the conductor 410 of the cable 400 such that the gas transitions back into a supercritical state, as previously discussed.

Figure 9:
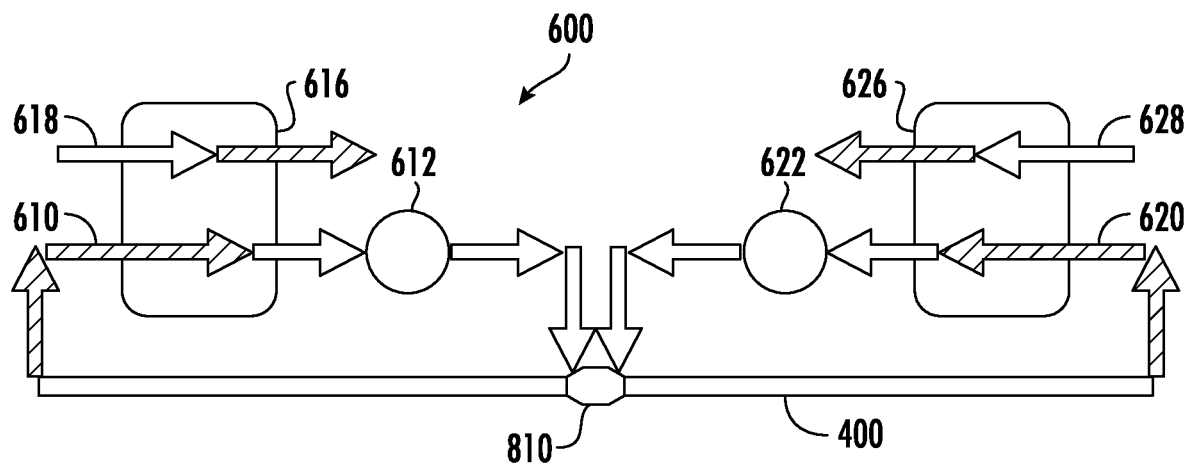
FIG. 9 is a schematic view of a fluid circulation system in accordance with an exemplary embodiment of the present disclosure.

Referring now to FIG. 9, a schematic view of a fluid circulation system 600 in accordance with an exemplary embodiment of the present disclosure is shown. In this example, the fluid circulation system 600 can include two heat exchangers 616, 626 and two coolant fluid flowpaths 618, 628, each extending through one of the heat exchangers 616, 626. Each of the fluid circuits 610, 620 that includes the fluid 405 (see, e.g., FIGS. 4 through 7) extends through a heat exchanger 616, 626 and at least a portion of the hollow interior of the conductor 410 of the cable 400. Pumps 612, 622 in fluid communication with the fluid circuits 610, 620 can be provided to move the fluid 405. Even though not shown, one or more tanks 614 can be provided to store the fluid 405 in its liquid state, gas state, or its supercritical state.

The fluid circulation system 600 of FIG. 9 operates similarly to the fluid circulation system 600 of FIG. 8. However, two portions of cable 400 can be coupled together with a connector 810, which will be described in more detail, below. The fluid circulation system 600 of FIG. 9, because of the additional heat exchanger 626, may transfer an additional amount of heat away from the conductor 410 of the cable 400.

Referring now to FIG. 10, a cutaway top view of a fluid cable system 800 in accordance with an exemplary embodiment of the present disclosure is shown. As shown, the fluid cable system 800 includes a plurality of cables 400a-d, which can be configured similarly as the cables 400 as described in reference to FIGS. 4 through 7. For example, each of the cables 400a-d can include a conductor 410a-d, an electrical insulator 415a-d, and a casing 420a-d. The fluid cable system 800 can include at least one connector 810. In this example, the fluid cable system 800 includes three connectors 810a-c. In at least one example, the cables 400 are included in at least one of the fluid circuits 610, 620 as described in reference to FIGS. 8 and 9.

Each connector 810 can be configured to couple, mechanically and/or electrically, a cable 400 to another cable 400, a cable 400 to a power source, or a cable 400 to a power outlet. For example, as shown in FIG. 10, connector 810a can be configured to couple, mechanically and electrically, the cable 400a to a power source, such as the electric machine 56 or the energy storage device 55 as described in reference to FIGS. 1 through 3; connector 810b can be configured to couple, mechanically and electrically, the cable 400a to another cable 400b; and connector 810c can be configured to couple, mechanically and electrically, the cable 400b to two other cables 400c-d. Even though not shown, another connector 810 can be provided to couple, mechanically and electrically, a cable 400 to a power outlet, such as the electric motor 206 as described in reference to FIG. 3 or the electric component 901 as will be described in reference to FIGS. 13 through 15.

Referring now also to FIG. 11, providing a close-up, cutaway view of the connector 810a and cable 400a of FIG. 10, each of the connectors 810a-c can include a housing 812a-c and an electrical insulator 814a-c disposed between the conductor 410a-c and the housing 812a-c. In the example of connector 810a, the connector 810a also includes a first fluid inlet 813a that is in fluid communication with the conductors 410a-d of the cables 400a-d. The first fluid inlet 813a may provide a flow of the fluid 405 to the conductors 410a-d of the cables 400a-d. In this example, the first and second fluid inlets 813a-b extend from the housings 812a-b. However, in other examples, the first and second fluid inlets 813a-b could extend from the body of the cables 400a-d.

Referring still to FIGS. 10 and 11, the electrical insulator 814 can be any material or substance that provides electrical insulation between the conductor 410 and the housing 812 of the connector 810. For example, the electrical insulator 814 can have a volume resistivity of at least $10^8$ ohm-cm at 25° C. and up to $10^{15}$ ohm-cm at 25°. In at least one example, the electrical insulator 814 is a pressurized fluid, such as a pressurized liquid or a pressurized gas. For example, the electrical insulator 814 can be pressurized CO2 ($CO_2$), nitrogen, argon, helium, or air in their liquid or gas states. In another example, the electrical insulator 814 is a solid. For example, the electrical insulator 814 can be a ceramic composite, polymer composite, polymer and ceramic composite, polymer or a plastic, such as a semi-crystalline polymer, a fluoropolymer, an amorphous plastic, a thermosetting polymer, a thermoplastic. More specifically, the electrical insulator 814 can be epoxy composite, polyimide composite, silicone composite, silicone, polyamide-imide, polytetrafluoroethylene or polyetheretherketone.

The housing 812 can be manufactured from any material that provides for EMI protection. For example, the housing 812 can be manufactured from a metal. For example, the housing 812 can be manufactured from an aluminum alloy, such as grade 6061 aluminum alloy. In other examples, the housing 812 can be manufactured from copper, titanium, pre-tin plated steel, or gold. In yet other examples, the housing 812 can be manufactured from a ceramic composite, such as a composite with a ceramic matrix phase and a conductive or EMI shielding material filler. In still yet another example, the housing 812 can be manufactured from a carbon composite or metallized fiber composite, such as a composite with a polymer matrix phase and a carbon filler, such as carbon fiber or carbon nanotubes.

Referring to FIG. 10, the connector 810b can be provided to couple two cables 400a-b together, electrically and mechanically. Additionally, connector 810b also includes a second fluid inlet 813b that provides a flow of fluid 405 to the downstream conductors 410b-d of the fluid cable system 800. The second fluid inlet 813b is in fluid communication with and downstream from the first fluid inlet 813a of the fluid cable system 800. The second fluid inlet 813b can be included to provide additional cooling to the downstream conductor 410b-d of the cables 400b-d. For example, the fluid 405 provided by the first fluid inlet 813a may only be able to sufficiently dissipate heat from a certain length of cable 400, such as the length of cable 400a. As such, the second fluid inlet 813b may be included to provide cooling to the portion of the fluid cable system 800 that is downstream of the second fluid inlet 813b. Even though only first and second fluid inlets 813a-b are shown, it should be understood that any number of inlets 813 can be provided to sufficiently cool the fluid cable system 800. Further, although only inlets 813 are shown, it should be appreciated that one or more of the connectors 810 may additionally or alternatively include a fluid outlet to facilitate the flow through the hollow interior of the conductors 410 of the cables 400. For example, the second fluid inlet 813b may serve as an outlet for the fluid cable system 800.

As shown, the fluid cable system 800 also includes the connector 810c that can electrically couple the cable 400b to two other cables 400c-d. Even though shown as a T-shaped connector 810, it should be understood that other shapes or angles of the cables 400b-d are contemplated. For example, cables 400c-d can extend from cable 400b in a Y-shape.

Incorporating a connector, such as the connectors 810, into a fluid cable system 800 has several benefits. First, the connector 810 may reduce the cost of maintenance to the fluid cable system 800. For example, the connector 810 may be decoupled from the cables 400 and each of the cables 400 may be decoupled from the connector 810. As such, when one of the connectors 810 needs to be replaced or repaired, it may be unnecessary to remove any of the cables 400 from the fluid cable system 800. Similarly, when one of the cables 400 need to be replaced or repaired, it may be unnecessary to remove any of the other cables 400 or the connectors 810 from the fluid cable system 800.

Referring to all examples provided, even though the cable 400 of the present disclosure has been described in relation to a propulsion system 50 for an aircraft 10, it should be understood that the described cable 400 can be used for other applications. For example, the described cable 400 could be used for wind turbines, electric trains, electric automobiles, or electric ships. In yet other examples, the described cable 400 could be used for other applications, such as industrial applications, such as power grids, power generation systems, or power transmission systems.

Figure 12:
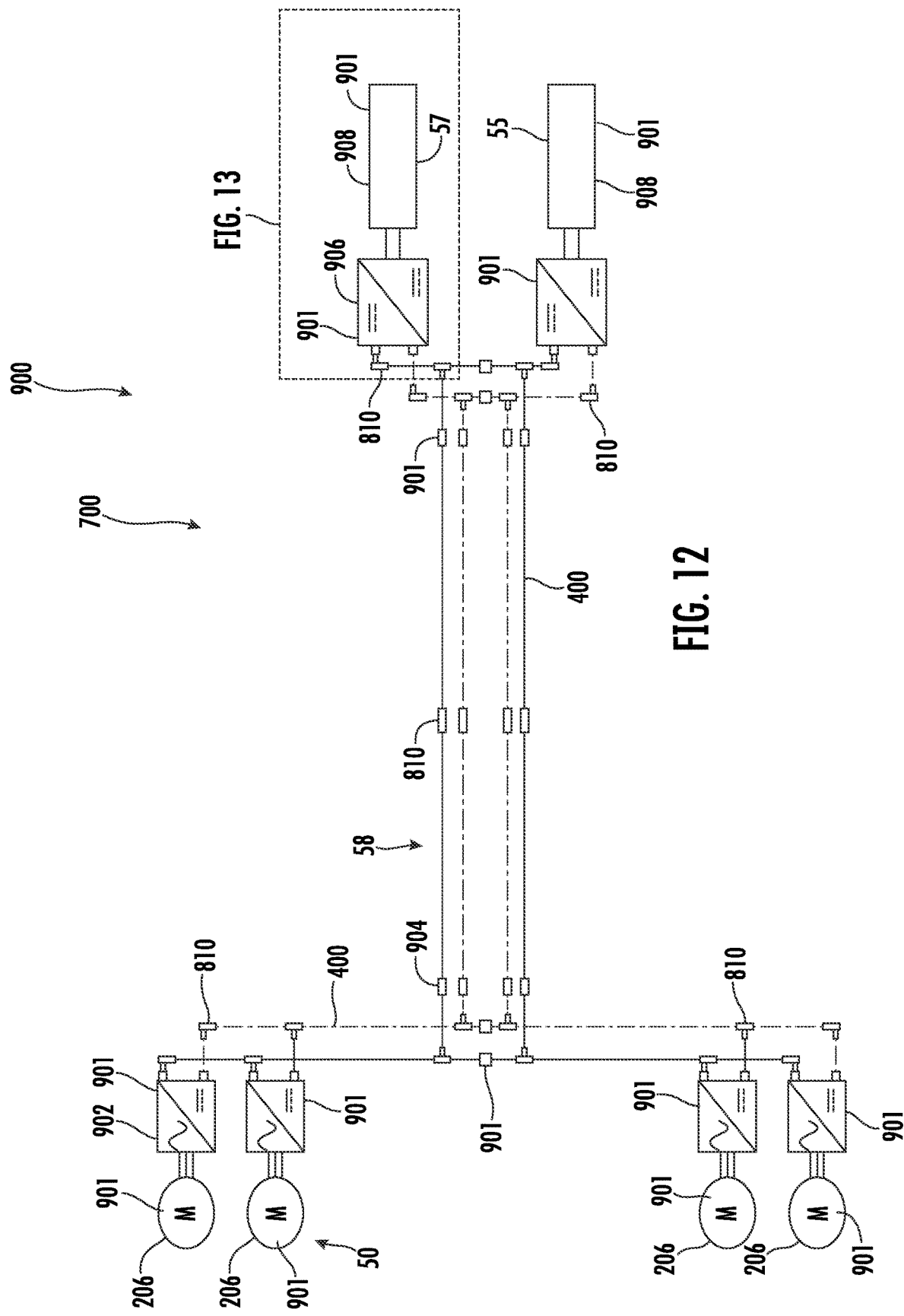
FIG. 12 is a schematic view of an electric system in accordance with an exemplary embodiment of the present disclosure.

Referring now to FIG. 12, a schematic view of an electric system 700 in accordance with an exemplary embodiment of the present disclosure is shown. In this example, the electric system 700 is an electric powertrain 900 that can be incorporated into a propulsion system 50. As depicted in this example, the propulsion system 50 includes four motors 206. Each of the motors 206 can be incorporated into a propulsor assembly 200, such as the propulsor assembly 200 that is depicted in FIG. 3, for coupling to a rotary component. In other examples, the electric powertrain 900 can be incorporated into a propulsion system 50 that includes less than four motors 206 or more than four motors 206. For example, the electric powertrain 900 can be incorporated into the propulsion system 50 of FIG. 1, which includes one propulsor assembly 200 that includes one motor 206.

As shown in FIG. 12, the electric powertrain 900 can include at least one electric component 901. For example, the electric powertrain 900 can include at least one motor 206, at least one inverter 902 that is configured to convert direct current (DC) to alternating current (AC), at least one circuit breaker 904, at least one electrical power bus 58 that can include one or more cables 400, at least one converter 906 that can convert AC to DC, and/or at least one energy source 908. In at least one example, the energy source 908 is an energy storage device 55, such as an electric battery. In at least one example, the energy source 908 is a fuel cell 57.

Although not shown, the electric powertrain 900 can also include at least one electric machine 56, such as a generator, that can be electrically coupled, directly or indirectly, to an energy storage device 55 or can be electrically coupled, directly or indirectly, to at least one of the electric components 901 of the electric powertrain 900, such as coupled to at least one of the motors 206. The electric powertrain 900 can also include other electric components 901 such as at least one electrical disconnect 61 and/or at least one electric controller 62, as described above. In yet another example, the electric powertrain 900 can include at least one converter 906 that can convert DC voltage to another DC voltage, or at least one converter 906 that can convert one form of AC (voltage or frequency) to another form of AC, or any other combination.

In at least one example, at least one energy source 908 is a fuel cell 57. The fuel cell 57 can be configured as an electro-chemical device that can convert chemical energy from a fuel into electrical energy through an electro-chemical reaction of the fuel, such as hydrogen, with an oxidizer, such as oxygen contained in the atmospheric air. The fuel cells 57 may include Solid Oxide Fuel Cells (SOFC), Molten Carbonate Fuel Cells (MCFC), Phosphoric Acid Fuel Cells (PAFC), and Proton Exchange Membrane Fuel Cells (PEMFC), all generally named after their respective electrolytes.

Figure 13:
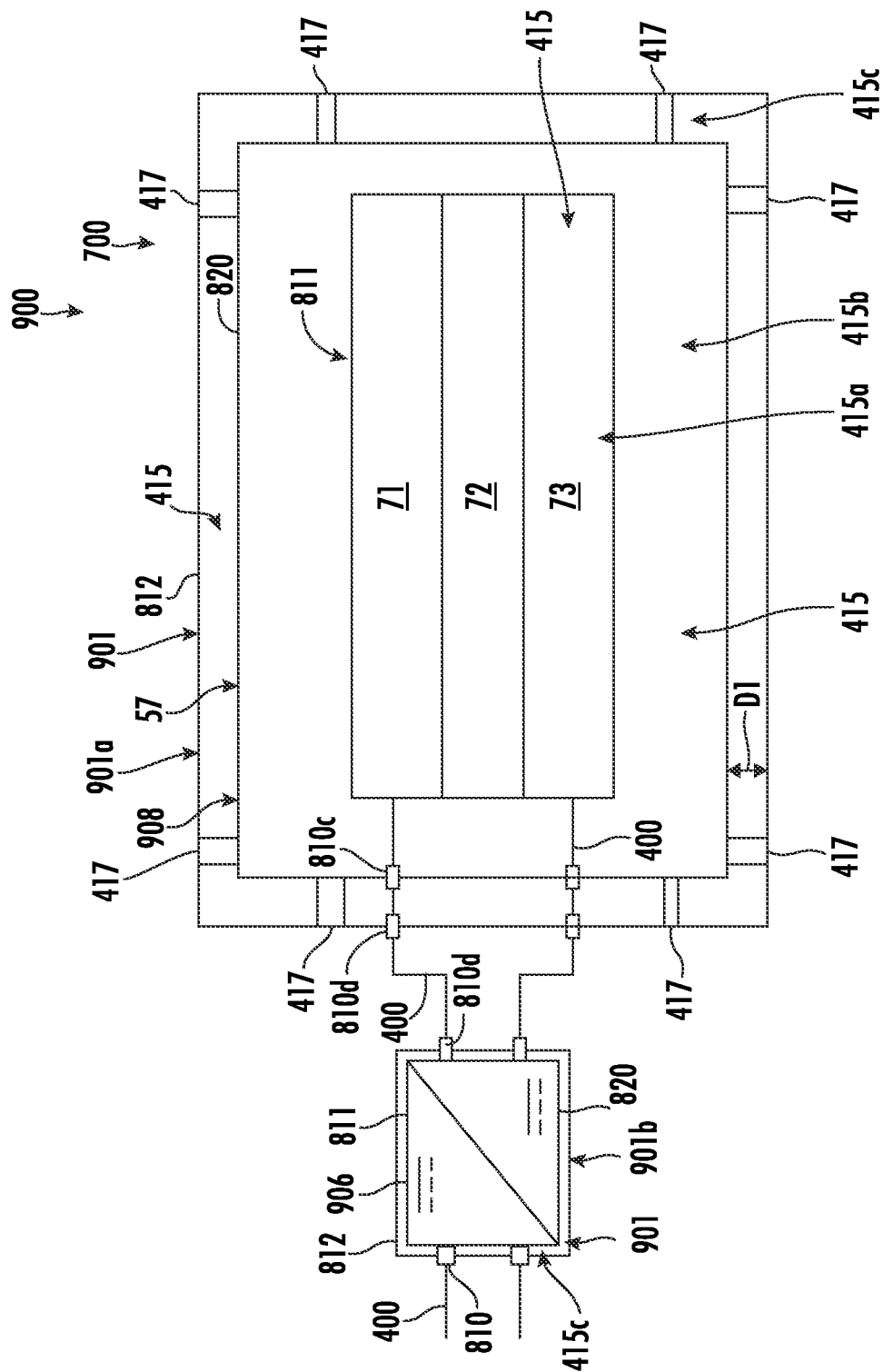
FIG. 13 is a schematic view of the electric system of FIG. 12 in accordance with an exemplary embodiment of the present disclosure.

Referring now to FIG. 13, a schematic view of a portion of the electric system 700 of FIG. 12 in accordance with an exemplary embodiment of the present disclosure is shown. As can be seen in this view of the portion of the electric system 700, which is an electric powertrain 900 in this example, the electric powertrain 900 includes two electric components 901, a first electric component 901a and a second electric component 901b. The first electric component 901a and the second electric component 901b can be coupled with at least one cable 400.

As shown, the first electric component 901a is an energy source 908, in this example. More specifically, the first electric component 901a is a fuel cell 57, in this example. Also, the second electric component 901b is a converter 906, in this example.

The fuel cell 57 can have an anode 71, a cathode 73, and an electrolyte 72 positioned between the anode 71 and the cathode 73. As will be appreciated by those skilled in the art, the electrolyte 72 may, during operation of the fuel cell 57, conduct negative ions from the cathode 73 to the anode 71 to generate electric power. The electric power can be transmitted to the second electric component 901b, converter 906, via one or more cables 400. One or more connectors 810 can be coupled to the first electric component 901a, the second electric component 901b and/or the one or more cables 400.

Referring still to FIG. 13, the first electric component 901a can include an encasement 820. The encasement 820 of the first electric component 901a can enclose the working components 811 of the first electric component 901a, such as the anode 71, the cathode 73, and the electrolyte 72. As used herein, the term "working components" refer to at least those components of an apparatus that generate, store, and/or transfer electric power, but can also include other components, such as structural and/or electrical insulating components. For example, the working component can be a stator or a rotor for an electric motor, an electronic busbar, a circuit breaker, a resistor or a capacitor of an electric device, a battery cell of an energy storage device, or an anode or a cathode of a fuel cell, to name a few examples.

The first electric component 901a can include a housing 812. The housing 812 of the first electric component 901a can enclose the encasement 820 of the first electric component 901a and/or the working components 811 of the first electric component 901a. In some examples, the first electric component 901a does not include an encasement 820 and the housing 812 encloses the working components 811 of the first electric component 901a. In at least one example, the housing 812 does not make contact with either the encasement 820 or the working components 811 of the first electric component 901a. The housing 812 of the first electric component 901a can be manufactured from any material that provides for EMI protection. For example, the housing 812 can be manufactured from a metal. For example, the housing 812 can be manufactured from an aluminum alloy, such as grade 6061 aluminum alloy. In other examples, the housing 812 can be manufactured from copper, titanium, pre-tin plated steel, or gold. In yet other examples, the housing 812 can be manufactured from a ceramic composite, such as a composite with a ceramic matrix phase and a conductive or EMI shielding material filler. In still yet another example, the housing 812 can be manufactured from a carbon composite or metallized fiber composite, such as a composite with a polymer matrix phase and a carbon filler, such as carbon fiber or carbon nanotubes.

The first electric component 901a can include an electrical insulator 415c that is disposed between the housing 812 and the encasement 820. In another example, the electrical insulator 415b is disposed at least between the housing 812 and the working components 811 of the first electric component 901a. In yet another example, the electrical insulator 415b is at least disposed between the housing 812 and the working components 811 of the first electric component 901a, but the first electric component 901a does not include an encasement 820. In at least one example, the electrical insulator 415a is disposed at least within the working components. The electrical insulator 415 can completely surround the working components 811 and/or the encasement 820.

The electrical insulator 415 can be any material or substance that provides electrical insulation between the encasement 820 and either the housing 812 or the working components 811 of the first electric component 901a. For example, the electrical insulator 415 can have a volume resistivity of at least $10^8$ ohm-cm at 25° C. and up to $10^{15}$ ohm-cm at 25°. In at least one example, the electrical insulator 415 is a pressurized fluid, such as a pressurized liquid or a pressurized gas. For example, the electrical insulator 415 can be pressurized $CO_2$, nitrogen, argon, helium, or air in their liquid or gas states. In one example, the electrical insulator 415 is a pressurized gas that has a pressure of at least 0.1 MPa and up to 2 MPa. The pressure of the pressurized gas of the electrical insulator 415 can be greater than the pressure of the fluids, such as air, surrounding the first electric component 901a and/or greater than the pressure of the pressurized gas within the housing 812 and/or the working components 811 of the first electric component 901a.

In another example, the electrical insulator 415 is a solid. For example, the electrical insulator 415 can be a ceramic composite, polymer composite, polymer and ceramic composite, polymer or a plastic, such as a semi-crystalline polymer, a fluoropolymer, an amorphous plastic, a thermosetting polymer, a thermoplastic. More specifically, the electrical insulator 415 can be an epoxy composite, polyimide composite, silicone composite, silicone, polyamide-imide, polytetrafluoroethylene or polyetheretherketone. In at least one example, the electrical insulator 415a within the working components 811 is a gas and the electrical insulator 415c between the encasement 820 and the housing 812 is a solid.

Providing the electrical insulator 415 may have several benefits. First, incorporating the electrical insulator 415 within the electric component 901 can reduce the affect that altitude has on the amount of electrical insulation achieved by the electrical insulator 415. For example, when the electric component 901 is manufactured, a certain volume of the electrical insulator 415 may be introduced into the electric component 901 and the cavity between the housing and the working component may be sealed. Because the volume of the electrical insulator 415 is sealed, the volume, along with the density, may be unaffected by altitude. For example, when the electrical insulator 415 is a gas, the dielectric breakdown of the gas is determined by its density. Therefore, because the density of the pressurized gas may be unaffected by altitude, the dielectric breakdown of the gas may be unaffected by altitude. Because the dielectric breakdown of the gas may be unaffected, the insulating properties of the electrical insulator 415 of the electric component 901 may also be unaffected by altitude.

Second, incorporating the electrical insulator 415 within the electric component 901 can reduce degradation by partial discharge at high altitude. For example, when the electrical insulator 415 is a gas, such as air or $CO_2$, the insulating properties of the gas decreases as the altitude increases. For an electric component 901 that incorporates an electrical insulator 415 that is not a pressurized fluid, air or other gas can be present within the electrical insulator 415. As such, because the breakdown voltage of air or any gas decreases as the altitude increases according to Paschen's law, the insulating properties of the electrical insulator 415 also decreases. Therefore, because of the reduced insulating properties, the risk of a partial discharge of the electric component 901 may increase as the altitude increases. However, for the electric component 901 that incorporates pressurized gas as the electrical insulator 415, the insulating properties of the pressurized gas may not decrease as the altitude increases. Therefore, the risk of a partial discharge of the electric component 901 may be unaffected by the altitude or affected less by the altitude.

Referring still to FIG. 13, the first electric component 901a can include spacers 417. Each spacer 417 can be positioned between the housing 812 of the first electric component 901a and the encasement 820 of the first electric component 901a. The spacers 417 may allow the housing 812 to remain spaced apart from the encasement 820 of the first electric component 901a and/or spaced apart from the working components 811 of the first electric component 901a by a distance D1. The distance D1 may allow for a sufficient amount of insulation to be provided by the electrical insulator 415. For example, the distance D1 can be at least two mm, such as at least three mm, such as at least four mm, such as at least five mm, such as at least six mm, and up to fifty mm, such as up to forty mm, such as up to thirty mm, such as up to twenty mm. The distance D1 between the housing 812 and the encasement 820 may be a minimum distance that extends completely around the encasement 820 and/or the working component 811 in all directions such that the housing 812 does not make contact with the encasement 820 and/or the working component 811. In at least one example, the distance D1 fluctuates by less than five percent, such as less than three percent, such as less than two percent, such as less than one percent. However, in other examples, the distance D1 may be greater in some areas to allow for greater insulating properties in those areas. For example, the distance D1 may be five percent or greater, such as seven percent or greater, such as ten percent or greater in one area than another area.

Even though eight spacers 417 are shown in the cross-sectional, schematic view of FIG. 13, it should be understood that first electric component 901a can include any number of spacers 417. The spacers 417 can be manufactured from an electrically insulating material with a relatively high temperature capability. For example, the spacers 417 can be manufactured from a ceramic such as alumina, a machinable glass ceramic material, boron nitride, aluminum nitride, cordierite, or steatite. In other examples, the spacers 417 can be manufactured from a polymer or a plastic, such as a semi-crystalline polymer, a fluoropolymer, an amorphous plastic, a thermosetting polymer, or a thermoplastic. More specifically, the spacers 417 can be polyamide-imide, polytetrafluoroethylene or polyetheretherketone. In some examples, the spacers 417 are a glass or ceramic composite with silicone or epoxy resins or engineered thermal plastics. Each of the spacers 417 can be any shape and can extend partially or fully along a length of the first electric component 901a.

Referring still to FIG. 13, the second electric component 901b of the electric powertrain 900 can include an encasement 820. The encasement 820 of the second electric component 901b can be configured similarly or the same as the encasement 820 of the first electric component 901a. For example, the encasement 820 of the second electric component 901b can enclose the working components 811 of the second electric component 901b. The second electric component 901b can include a housing 812, which can be configured similarly or the same as the housing 812 of the first electric component 901a. For example, the housing 812 of the second electric component 901b can enclose the encasement 820 of the second electric component 901b and/or the working components 811 of the second electric component 901b. Similarly to the first electric component 901a, the second electric component 901b can also include at least an electrical insulator 415c that is disposed between the housing 812 and the encasement 820 of the second electric component 901b, but may also include electrical insulator 415a and/or electrical insulator 415b, as described in relation to the first electric component 901a. Although not shown, the second electric component 901b can also include spacers 417.

As best seen in FIG. 13, the connectors 810 of the electric powertrain 900 can be positioned at various locations. For example, at least one of the connectors 810, such as connector 810c, can be coupled to the encasement 820 of one of the electric components 901. Additionally, at least one of the connectors 810, such as connector 810d, can be coupled to the housing 812 of one of the electric components 901. Incorporating connectors 810 within the electric powertrain 900 may allow for additional insulation and/or may allow for the use of a fluid, such as fluid 405, which can be a supercritical fluid, such as supercritical $CO_2$, to be positioned within the cable 400 for cooling purposes, as explained above, and/or positioned within the electric component 901 for cooling purposes. For example, the fluid 405 can be positioned between the encasement 820 and the housing 812 of the electric component to cool the electric component.

Figure 14:
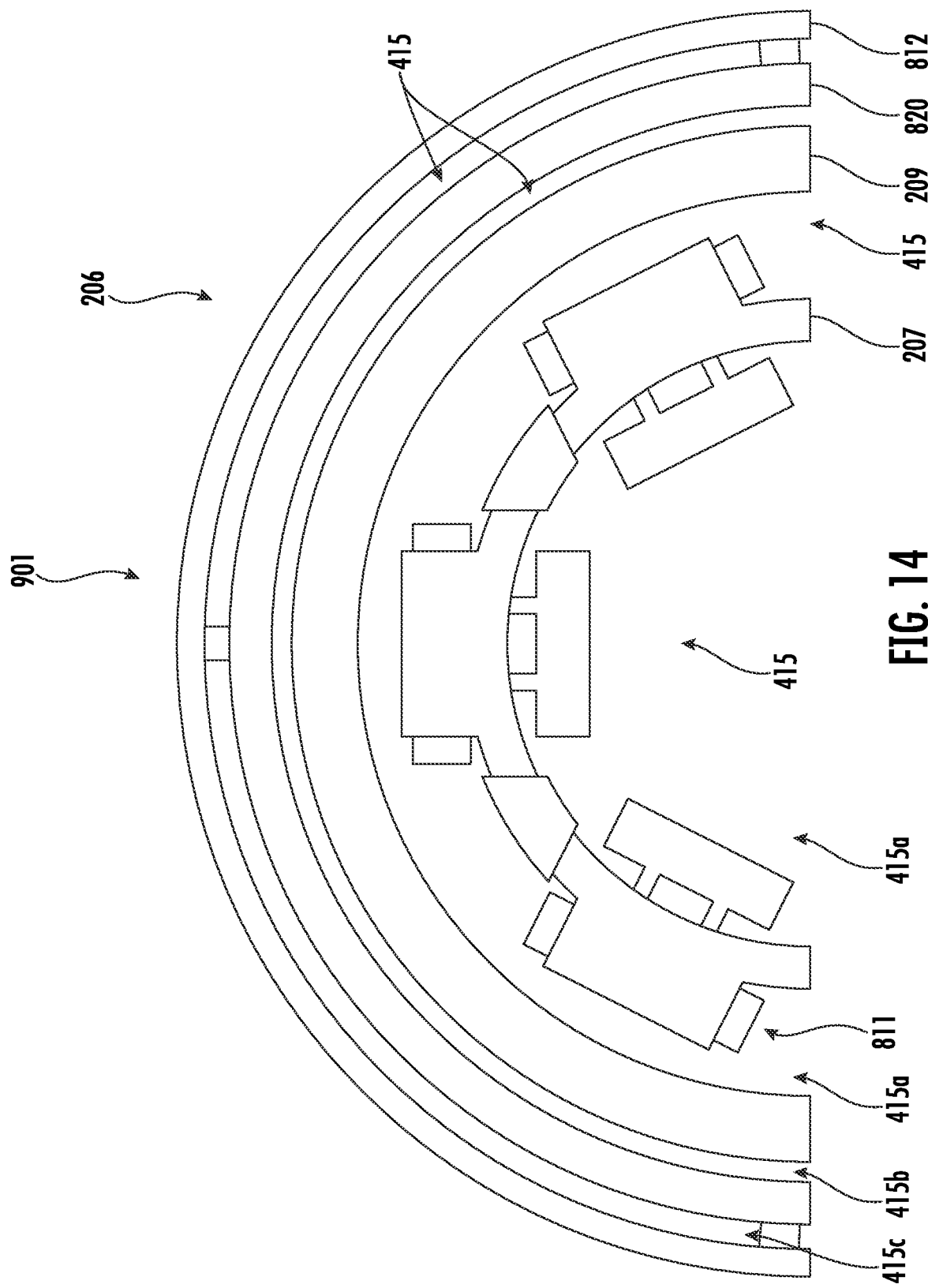
FIG. 14 is a cross-sectional, schematic view of an electric component of an electric system in accordance with an exemplary embodiment of the present disclosure.

Referring now to FIG. 14, a cross-sectional, schematic view of an electric component 901 of electric powertrain 900 in accordance with an exemplary embodiment of the present disclosure is shown. In this example, the electric component 901 is an electric motor 206 and is configured to convert electrical power into mechanical power. The electric motor 206 can include a stator 207 and a rotor 209 and can be configured in any manner. For example, the various examples of electric machine provided in U.S. application Ser. No. 15/354,323 filed Nov. 17, 2016, which is hereby incorporated by reference in its entirety, are contemplated.

The electric component 901 of FIG. 14 can be configured similarly as the first electric component 901a and/or the second electric component 901b of FIG. 13. For example, the electric component 901 can include an encasement 820, a housing 812, and/or spacers 417. An electrical insulator 415c can be positioned between the housing 812 and the encasement 820, and/or an electrical insulator 415b can be positioned between the working components 811 and either the encasement 820 or the housing 812, and/or an electrical insulator 415a can be positioned within the working components 811 of the electric component 901. In this example, where the electric component 901 is an electric motor 206, the working components 811 can include the stator 207, the rotor 209, the windings of the stator 207, and/or the magnets of the rotor. As can be seen in FIG. 14, the electrical insulator 415a can be positioned within the stator 207 and/or between the stator 207 and the rotor 209.

Figure 15:
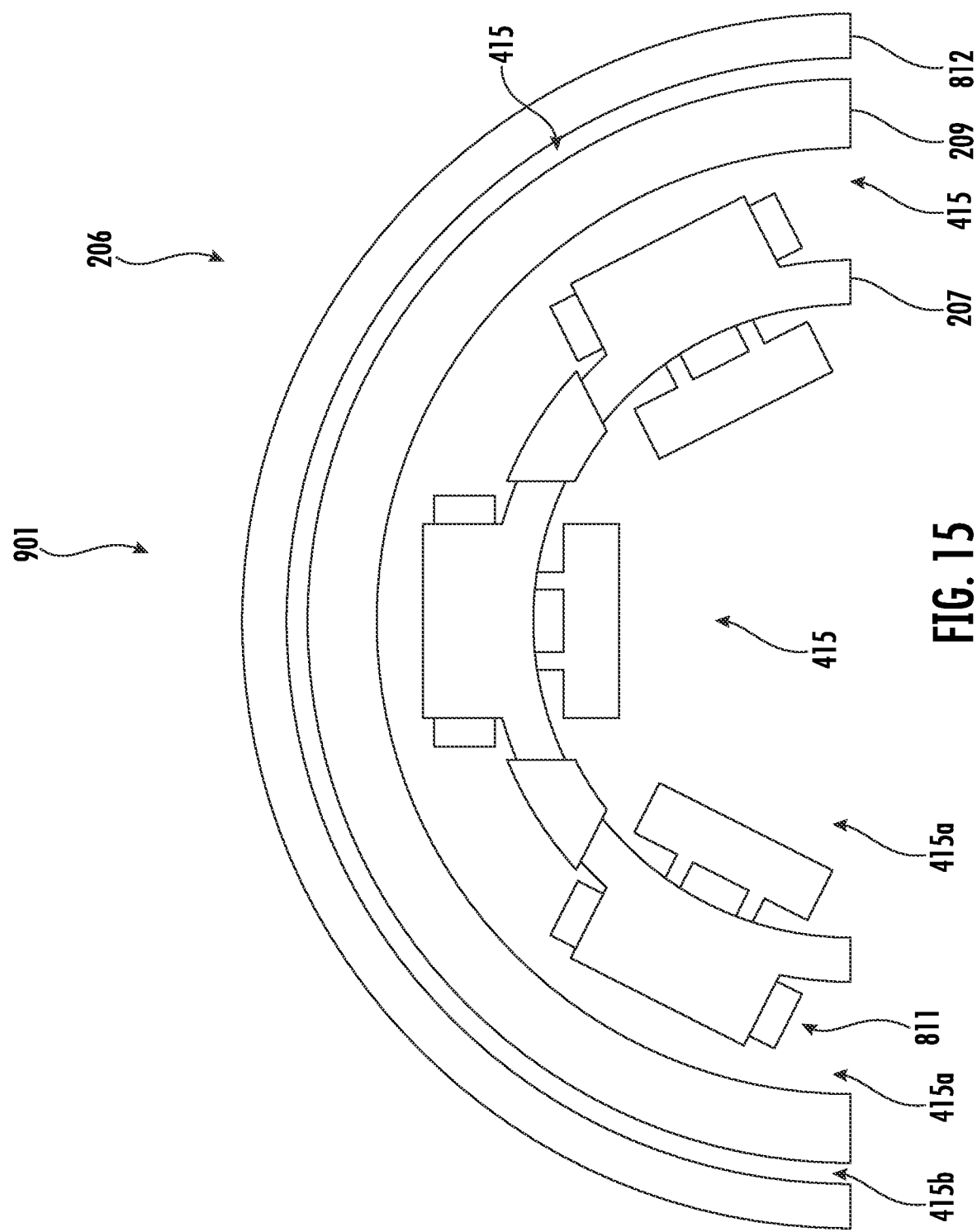
FIG. 15 is a cross-sectional, schematic view of an electric component of an electric system in accordance with an exemplary embodiment of the present disclosure.

Referring now to FIG. 15, a cross-sectional, schematic view of an electric component 901 of an electric system 700 in accordance with an exemplary embodiment of the present disclosure is shown. As mentioned, and as shown in FIG. 15, the electric component 901, in some examples, does not include an encasement 820. In this example, the electric component 901 includes the electrical insulator 415a that is within the working components 811 of the electrical component 901 and includes the electrical insulator 415b that is between the working components 811 and the housing 812.

Referring back to FIG. 12, it should be understood that some, none, or all electric components 901 of the electric system 700, such as electric powertrain 900, can be configured such that they include the electrical insulator 415, such as electrical insulator 415a, 415b, and/or 415c, within the housing 812. For example, in at least one example, only the fuel cells 57 and the converters 906 within the electric powertrain 900 include the electrical insulator 415 within their housings 812. In another example, only the circuit breakers 904 within the electric powertrain 900 include the electrical insulator 415.

It should also be understood that the cables 400 and/or the connectors 810 of the electric powertrain 900 can be configured as described in reference to FIGS. 4 through 7. For example, the cables 400 can include the fluid 405 that is positioned within the hollow interior of the cable's conductor 410. However, in other examples, the cables 400 do not include the fluid 405 that is positioned within the hollow interior of the cable's conductor 410 or the cables 400 may not have a hollow interior. Additionally, the electrical insulator 415 of the cables 400 may be the same as the electrical insulator 415 of the one or more electric components 901 of the electric powertrain 900. For example, the electrical insulator 415 of the cables 400 and the electrical insulator 415 of the one or more electric components 901 can both be a pressurized gas, such as pressurized $CO_2$. Additionally, when the electrical insulator 415 of the one or more electric components 901 and the electrical insulator 415 of the cables 400 are the same and are a pressurized gas, the pressure of the pressurized gas of the cables 400 can be different than the pressure of the pressurized gas of the one or more electric components 901. In another example, the pressure of the pressurized gas of the cables 400 can be substantially similar than the pressure of the pressurized gas of the one or more electric components 901. For example, the pressure of the pressurized gas of the cables 400 can be within five percent of the pressure of the pressurized gas of the one or more electric components 901. It should also be understood that the pressure of the pressurized gas of each of the electric components 901 may be substantially the same, such as within five percent of each other. However, in another example, the pressures of the pressurized gas of at least one of the electric components 901 may be different such that a pressure of the pressurized gas of a first electric component 901a is at least five percent greater than a pressure of the pressurized gas of a second electric component 901b.

Even though various examples provided of electric system 700 have been described in relation to an electric powertrain 900 for a propulsion system 50, it should be understood that electric system 700 can be used in various other applications. For example, the electric system 700, electric component 901, fluid cable system 800, fluid circulation system 600, and/or cable 400 may be used within other electric system 700 applications, such as power grids, power generation stations, or an any other industrial application.

As mentioned, above, incorporating an electrical insulator 814, such as pressurized gas, within the electric component 901 may reduce the effect that altitude has on the amount of electrical insulation achieved by the electrical insulator 814, may reduce degradation by partial discharge at high altitude, and may allow the electric component 901 to remain useful even after an electrical discharge and/or the electric component 901 experiences a fault current between the housing 812 and the working component 811. Additionally, it will be appreciated that the discussed configurations for the electric component 901 may be particularly useful when the electric component 901 is incorporated into, e.g., an aeronautical propulsion system for an aeronautical vehicle. Also, it will be appreciated that the discussed configurations for the electric component 901 may be particularly useful when incorporated into, e.g., power grids, power generation stations, or an any other industrial application.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

A cable for electric power transmission, the cable including a conductor defining a hollow interior, a casing surrounding the conductor, an electrical insulator positioned between the conductor and the casing, and a fluid positioned within the hollow interior of the conductor.

The cable of any preceding clause, wherein the electrical insulator is a pressurized gas.

The cable of any preceding clause, wherein the electrical insulator is a pressurized carbon dioxide (CO2).

The cable of any preceding clause, wherein the electrical insulator is a pressurized nitrogen (N2), a pressurized air, a pressurized CO2, or a pressurized fluorocarbon.

The cable of any preceding clause, wherein the electrical insulator is a pressurized helium, a pressurized argon, a pressurized hydrogen, a pressurized hydrocarbon, or a pressurized sulfur hexafluoride.

The cable of any preceding clause, wherein the electrical insulator is a combination of at least two pressurized gases selected from the group consisting of the pressurized N2, the pressurized air, the pressurized CO2, the pressurized fluorocarbon, the pressurized helium, the pressurized argon, the pressurized hydrogen, the pressurized hydrocarbon, and the pressurized sulfur hexafluoride.

The cable of any preceding clause, wherein the electrical insulator is a pressurized fluid having a pressure of at least 0.1 megapascal (MPa).

The cable of any preceding clause, wherein the fluid within the hollow interior of the conductor is a supercritical fluid.

The cable of any preceding clause, wherein the supercritical fluid is supercritical CO2.

The cable of any preceding clause, wherein the supercritical fluid is configured to have a flow rate of at least 2 meters per second.

The cable of any preceding clause, wherein the conductor is configured to have a current density of at least 8 Amperes per square millimeter (A/mm2).

A cable system for electric power transmission, the cable system including a cable including a first conductor defining a first hollow interior, a casing surrounding the first conductor, and a first electrical insulator positioned between the first conductor and the casing, a connector coupled to the cable, the connector including a second conductor defining a second hollow interior, a housing surrounding the second conductor, a second electrical insulator positioned between the second conductor and the housing, and a fluid inlet in fluid communication with the first conductor and the second conductor, and a fluid positioned within the first hollow interior and the second hollow interior.

The cable system of any preceding clause, wherein the first electrical insulator is a pressurized gas and the second electrical insulator is a solid.

The cable system of any preceding clause, wherein the fluid within the first hollow interior and the second hollow interior is a supercritical fluid.

A propulsion system for an aircraft, the propulsion system including a rotary component, an electric motor mechanically coupled to the rotary component, a fluid circulation system including a cable, the cable being electrically coupled to the electric motor and including a conductor defining a hollow interior, a casing surrounding the conductor an electrical insulator positioned between the conductor and the casing, and a fluid positioned within the hollow interior of the conductor.

The propulsion system of any preceding clause, wherein the electrical insulator is a pressurized gas.

The propulsion system of any preceding clause, wherein the fluid circulation system further including a heat exchanger, a coolant flowpath extending through the heat exchanger, and a fluid circuit including the fluid, wherein the fluid circuit extends through the heat exchanger and the hollow interior of the conductor of the cable.

The propulsion system of any preceding clause, wherein the fluid circulation system including a pump in fluid communication with the fluid circuit.

The propulsion system of any preceding clause, further including an electric machine, an energy storage device, or both, wherein the cable is electrically coupled to the electric machine, the energy storage device, or both.

The propulsion system of any preceding clause, wherein the electrical insulator is a pressurized fluid having a pressure of at least 0.1 megapascal (MPa).

The propulsion system of any preceding clause, wherein the fluid is configured to have a flow rate of at least 2 meters per second.

The propulsion system of any preceding clause, wherein the conductor is configured to have a current density of at least 8 Amperes per square millimeter (A/mm2).

An electric powertrain for an electrical propulsion system, the electric powertrain including an electric component including a working component; a housing that encloses the working component; and an electrical insulator disposed between the housing and the working component.

The electric powertrain of any preceding clause, wherein the electric component is a first electric component, the electrical insulator is a first electrical insulator, and the electric powertrain further includes a second electric component including a second working component; a second housing that encloses the working component; and a second electrical insulator disposed between the housing and the working component; and a cable for electric power transmission that is coupled to the first electric component and the second electric component, the cable including a conductor defining a hollow interior; a casing surrounding the conductor; and a third electrical insulator positioned between the conductor and the casing.

The electric powertrain of any preceding clause, wherein the cable further includes a supercritical fluid positioned within the hollow interior of the conductor.

The electric powertrain of any preceding clause, wherein the first electrical insulator of the first electric component is a first pressurized gas, the second electrical insulator of the second electric component is a second pressurized gas, and the third electrical insulator of the cable is a third pressurized gas.

The electric powertrain of any preceding clause, wherein the first pressurized gas, the second pressurized gas, and the third pressurized gas are the same gas with a pressure that is within five percent of each other. 6. The electric powertrain of claim 1, wherein the electrical insulator has a volume resistivity of at least 108 ohm-cm.

The electric powertrain of any preceding clause, wherein the electrical insulator is a pressurized gas having a pressure of at least 0.1 megapascal (MPa) and up to 2 MPa.

The electric powertrain of any preceding clause, wherein the pressurized gas is pressurized carbon dioxide (CO2), nitrogen, argon, helium, hydrogen, hydrocarbons, fluorocarbons, air or any combinations of these gases.

The electric powertrain of any preceding clause, wherein the electrical insulator is a pressurized nitrogen (N2), a pressurized air, a pressurized CO2, or a pressurized fluorocarbon.

The electric powertrain of any preceding clause, wherein the electrical insulator is a pressurized helium, a pressurized argon, a pressurized hydrogen, a pressurized hydrocarbon, or a pressurized sulfur hexafluoride.

The electric powertrain of any preceding clause, wherein the electrical insulator is a combination of at least two pressurized gases selected from the group consisting of the pressurized N2, the pressurized air, the pressurized CO2, the pressurized fluorocarbon, the pressurized helium, the pressurized argon, the pressurized hydrogen, the pressurized hydrocarbon, and the pressurized sulfur hexafluoride.

The electric powertrain of any preceding clause, wherein the electric component further includes an encasement that encloses the working component, wherein the housing encloses the encasement and the electrical insulator is disposed between the encasement and the housing, wherein the encasement and the housing are spaced apart such that a minimum distance between the encasement and the housing is maintained completely around the encasement, wherein the minimum distance is at least two millimeters.

The electric powertrain of any preceding clause, wherein the electrical insulator is also disposed within the working component of the electric component.

The electric powertrain of any preceding clause, wherein the electric component includes a supercritical fluid.

The electric powertrain of any preceding clause, wherein the supercritical fluid is supercritical CO2.

The electric powertrain of any preceding clause, wherein the supercritical fluid is configured to have a flow rate of at least 2 meters per second.

The electric powertrain of any preceding clause, further including a connector.

The electric powertrain of any preceding clause, wherein the connector includes a supercritical fluid.

The electric powertrain of any preceding clause, wherein the connector includes a supercritical CO2.

An aeronautical propulsion system for an aeronautical vehicle, the aeronautical propulsion system including an electric powertrain including an electric component, the electric component including a working component; a housing that encloses the working component; and an electrical insulator disposed between the housing and the working component.

An electric component for an electric system, the electric component including a working component; a housing that encloses the working component; and an electrical insulator disposed between the housing and the working component.

The electric component of any preceding clause, wherein the electrical insulator has a volume resistivity of at least 108 ohm-cm.

The electric component of any preceding clause, wherein the electrical insulator is a pressurized gas having a pressure of at least 0.1 megapascal (MPa) and up to 2 MPa.

The electric component of any preceding clause, wherein the pressurized gas is pressurized carbon dioxide (CO2), nitrogen, argon, helium, hydrogen, hydrocarbons, fluorocarbons, air or any combinations of these gases.

The electric component of any preceding clause, wherein the working component and the housing are spaced apart such that a minimum distance between the working component and the housing is maintained completely around the working component.

The electric component of any preceding clause, wherein the minimum distance is at least two millimeters.

The electric component of any preceding clause, wherein the electric component further includes an encasement that encloses the working component, wherein the housing encloses the encasement and the electrical insulator is disposed between the encasement and the housing.

The electric component of any preceding clause, wherein the working component is a stator or a rotor for an electric motor, an electronic busbar, a circuit breaker, a battery cell of an energy storage device, or an anode or a cathode of a fuel cell.

The electric component of any preceding clause, wherein the electrical insulator is also disposed within the working component of the electric component.

The electric component of any preceding clause, wherein the working component is configured to generate, store, and/or transfer electric power.

The electric component of any preceding clause, wherein the working component is a structural and/or electrical insulating component.

We claim:

1. An electric powertrain for an electrical propulsion system, the electric powertrain comprising:
    a first electric component comprising:
        a first working component comprising an energy source;
        a first housing that encloses the first working component; and
        a first electrical insulator disposed between the first housing and the first working component; and
    a second electric component coupled to the first electric component, the second electric component comprising:
        a second working component;
        a second housing that encloses the second working component; and
        a second electrical insulator disposed between the second housing and the second working component; and
    wherein the first electrical insulator of the first electric component is a first pressurized gas and the second electrical insulator of the second electric component is a second pressurized gas, and wherein the first pressurized gas and the second pressurized gas are the same gas.

2. The electric powertrain of claim 1, further comprising:
    a cable for electric power transmission that is coupled to the first electric component and the second electric component, the cable comprising:
    a conductor defining a hollow interior;
    a casing surrounding the conductor; and
    a third electrical insulator positioned between the conductor and the casing.

3. The electric powertrain of claim 2, wherein the cable further comprises a supercritical fluid positioned within the hollow interior of the conductor.

4. The electric powertrain of claim 2, wherein the third electrical insulator of the cable is a third pressurized gas, and wherein the first pressurized gas, the second pressurized gas, and the third pressurized gas are the same gas with a pressure that is within five percent of each other.

5. The electric powertrain of claim 1, wherein the working component is configured to generate, store, and/or transfer electric power.

6. The electric powertrain of claim 1, wherein the first and second electrical insulators have a volume resistivity of at least $10^8$ ohm-cm.

7. The electric powertrain of claim 1, wherein the first and second pressurized gases have a pressure of at least 0.1 megapascal (MPa) and up to 2 MPa.

8. The electric powertrain of claim 7, wherein the first and second pressurized gases are pressurized carbon dioxide ($CO_2$), nitrogen, argon, helium, hydrogen, hydrocarbons, fluorocarbons, air or any combinations of these gases.

9. The electric powertrain of claim 1, wherein the first electric component further comprises an encasement that encloses the first working component, wherein the first housing encloses the encasement and the first electrical insulator is disposed between the encasement and the first housing, wherein the encasement and the first housing are spaced apart such that a minimum distance between the encasement and the first housing is maintained completely around the encasement, wherein the minimum distance is at least two millimeters.

10. The electric powertrain of claim 1, wherein the first electrical insulator is also disposed within the first working component of the first electric component.

11. An aeronautical propulsion system for an aeronautical vehicle, the aeronautical propulsion system comprising:
    an electric powertrain comprising:
        a first electric component comprising:
            a first working component comprising an energy source;
            a first housing that encloses the first working component; and
            a first electrical insulator disposed between the first housing and the first working component; and
        a second electric component coupled to the first electric component, the second electric component comprising:
            a second working component;
            a second housing that encloses the second working component; and
            a second electrical insulator disposed between the second housing and the second working component; and
        wherein the first electrical insulator of the first electric component is a first pressurized gas and the second electrical insulator of the second electric component is a second pressurized gas, and wherein the first pressurized gas and the second pressurized gas are the same gas.

12. An electric component for an electric system, the electric component comprising:
    a working component comprising an energy source;
    a housing that encloses the working component;
    a first electrical insulator disposed between the housing and the working component; and
    a second electrical insulator disposed at least within the working component; and
    wherein the first electrical insulator is a first pressurized gas and the second electrical insulator is a second pressurized gas, and wherein the first pressurized gas and the second pressurized gas are the same gas.

13. The electric component of claim 12, wherein the first and second electrical insulators have a volume resistivity of at least 108 ohm-cm.

14. The electric component of claim 12, wherein the first and second pressurized gases have a pressure of at least 0.1 megapascal (MPa) and up to 2 MPa.

15. The electric component of claim 14, wherein the first and second pressurized gases are pressurized carbon dioxide (CO2), nitrogen, argon, helium, hydrogen, hydrocarbons, fluorocarbons, air or any combinations of these gases.

16. The electric component of claim 12, wherein the working component and the housing are spaced apart such that a minimum distance between the working component and the housing is maintained completely around the working component.

17. The electric component of claim 16, wherein the minimum distance is at least two millimeters.

18. The electric component of claim 12, wherein the electric component further comprises an encasement that encloses the working component, wherein the housing encloses the encasement and the first electrical insulator is disposed between the encasement and the housing.

19. The electric component of claim 12, wherein the working component comprises an anode or a cathode of a fuel cell.

* * * * *